(12) United States Patent
Hauber et al.

(10) Patent No.: US 6,866,492 B2
(45) Date of Patent: Mar. 15, 2005

(54) GYPSUM BOARD FORMING DEVICE

(75) Inventors: Robert J. Hauber, Lutz, FL (US); Christopher J. Sanders, Safety Harbor, FL (US); Mark E. Hennis, Indian Rocks Beach, FL (US); Michael P. Fahey, St. Petersburg, FL (US)

(73) Assignee: BPB plc, Slough (GB)

( * ) Notice: Subject to any disclaimer, the term of this patent is extended or adjusted under 35 U.S.C. 154(b) by 222 days.

(21) Appl. No.: 10/164,108

(22) Filed: Jun. 4, 2002

(65) Prior Publication Data

US 2002/0187296 A1 Dec. 12, 2002

Related U.S. Application Data

(63) Continuation-in-part of application No. 09/875,733, filed on Jun. 6, 2001, now Pat. No. 6,524,679.

(51) Int. Cl.[7] .............................. B28B 5/02; B28B 1/52; B28B 3/12; B28B 23/18; B28B 23/22
(52) U.S. Cl. .................. 425/96; 425/101; 425/104; 425/115; 425/123; 425/220; 425/224; 425/346 R; 156/346; 156/348
(58) Field of Search ................................. 156/346, 348; 425/104, 115, 123, 373, 505, 506, 95–96, 101, 220, 224, 346 R

(56) References Cited

U.S. PATENT DOCUMENTS

| | | | | |
|---|---|---|---|---|
| 1,578,250 A | * | 3/1926 | Armstrong | 156/45 |
| 1,654,024 A | | 12/1927 | Turner | 152/348 |
| 2,213,442 A | * | 9/1940 | Elliott | 156/348 |
| 3,578,517 A | * | 5/1971 | Lapp et al. | 156/40 |
| 3,915,919 A | | 10/1975 | Nishioka et al. | 521/54 |
| 3,944,698 A | | 3/1976 | Dierks et al. | 428/219 |
| 3,993,822 A | | 11/1976 | Knauf et al. | 428/213 |
| 4,105,383 A | * | 8/1978 | Hanson | 425/96 |
| 4,265,979 A | | 5/1981 | Baehr et al. | 428/171 |
| 4,288,263 A | | 9/1981 | Delcoigne et al. | 156/42 |
| 4,303,722 A | | 12/1981 | Pilgrim | 428/213 |
| 4,350,736 A | | 9/1982 | Reily | 428/341 |
| 4,378,405 A | | 3/1983 | Pilgrim | 428/322.7 |
| 4,420,299 A | * | 12/1983 | De Mets | 425/101 |
| 4,444,595 A | | 4/1984 | Baines et al. | 106/782 |
| 4,450,022 A | | 5/1984 | Galer | 156/42 |
| 4,477,300 A | | 10/1984 | Pilgrim | 156/44 |
| 4,488,917 A | * | 12/1984 | Porter et al. | 156/39 |
| 4,572,861 A | | 2/1986 | Barretto-Garcia et al. | 428/299.4 |
| 4,630,419 A | | 12/1986 | Pilgrim | 52/309.13 |

(List continued on next page.)

FOREIGN PATENT DOCUMENTS

| | | |
|---|---|---|
| CA | 09193779 | 7/1926 |
| CA | 0794590 | 9/1968 |
| DE | 1033123 | 6/1958 |
| DE | 1223287 | 8/1966 |
| EP | 0518156 | 12/1992 |

(List continued on next page.)

*Primary Examiner*—Michael P. Colaianni
*Assistant Examiner*—Michael I. Poe
(74) *Attorney, Agent, or Firm*—Ryndak & Suri; Vangelis Economou

(57) ABSTRACT

A gypsum board forming device having a gypsum forming station including two laterally disposed edger shoes, and at least one laterally disposed edger bar clamping element on the edger bar. In one embodiment a laterally extending forming plate extends over the top surface of the formed gypsum board, the forming plate including a plurality of micropore conduits through which pressurized water is supplied to provide a film of smoothing water over the top surface of the gypsum board. In another embodiment the edger shoes have a flapper mechanism for retaining unset slurry skimmed off the surface of the gypsum board by the edger bar.

13 Claims, 9 Drawing Sheets

U.S. PATENT DOCUMENTS

| | | | |
|---|---|---|---|
| 4,647,496 A | | 3/1987 | Lehnert et al. .............. 447/386 |
| 4,793,892 A | | 12/1988 | Miller et al. ................. 156/549 |
| 4,810,569 A | | 3/1989 | Lehnert et al. .............. 442/386 |
| 5,221,386 A | * | 6/1993 | Ensminger et al. ............ 156/40 |
| 5,319,900 A | | 6/1994 | Lehnert et al. ................ 52/408 |
| 5,350,554 A | * | 9/1994 | Miller ................... 264/171.11 |
| 5,371,989 A | | 12/1994 | Lehnert et al. ........... 52/309.17 |
| 5,395,685 A | | 3/1995 | Seth et al. ..................... 442/67 |
| 5,549,859 A | * | 8/1996 | Andersen et al. ........... 264/102 |
| 5,552,187 A | | 9/1996 | Green et al. .............. 427/389.8 |
| 5,704,179 A | | 1/1998 | Lehnert et al. ................ 52/408 |
| 5,714,032 A | | 2/1998 | Ainsley et al. .............. 156/346 |
| 5,718,797 A | * | 2/1998 | Phillips et al. .............. 156/346 |
| 5,804,615 A | | 9/1998 | Schreiber et al. ........... 523/414 |
| 5,981,406 A | | 11/1999 | Randall ....................... 442/71 |
| 6,001,496 A | * | 12/1999 | O'Haver-Smith ............ 428/703 |
| 6,054,205 A | | 4/2000 | Newman et al. ............ 428/221 |
| 6,110,575 A | | 8/2000 | Haga ....................... 428/299.7 |
| 6,187,409 B1 | | 2/2001 | Mathieu ....................... 428/70 |
| 6,190,476 B1 | | 2/2001 | Seecharan et al. ............ 156/39 |
| 6,524,679 B2 | * | 2/2003 | Hauber et al. ................ 428/68 |
| 6,737,156 B2 | * | 5/2004 | Koval et al. ............. 428/294.7 |

FOREIGN PATENT DOCUMENTS

| | | |
|---|---|---|
| EP | 0640674 | 3/1995 |
| EP | 69702115 | 3/1996 |
| GB | 0772581 | 4/1957 |
| GB | 1250713 | 10/1971 |
| GB | 1344479 | 1/1974 |
| GB | 2053779 | 2/1981 |
| GB | 2225599 | 6/1990 |
| GB | 0427063 | 1/1994 |
| GB | 2316693 | 3/1998 |
| WO | 9809033 | 3/1998 |
| WO | 9832579 | 7/1998 |

\* cited by examiner

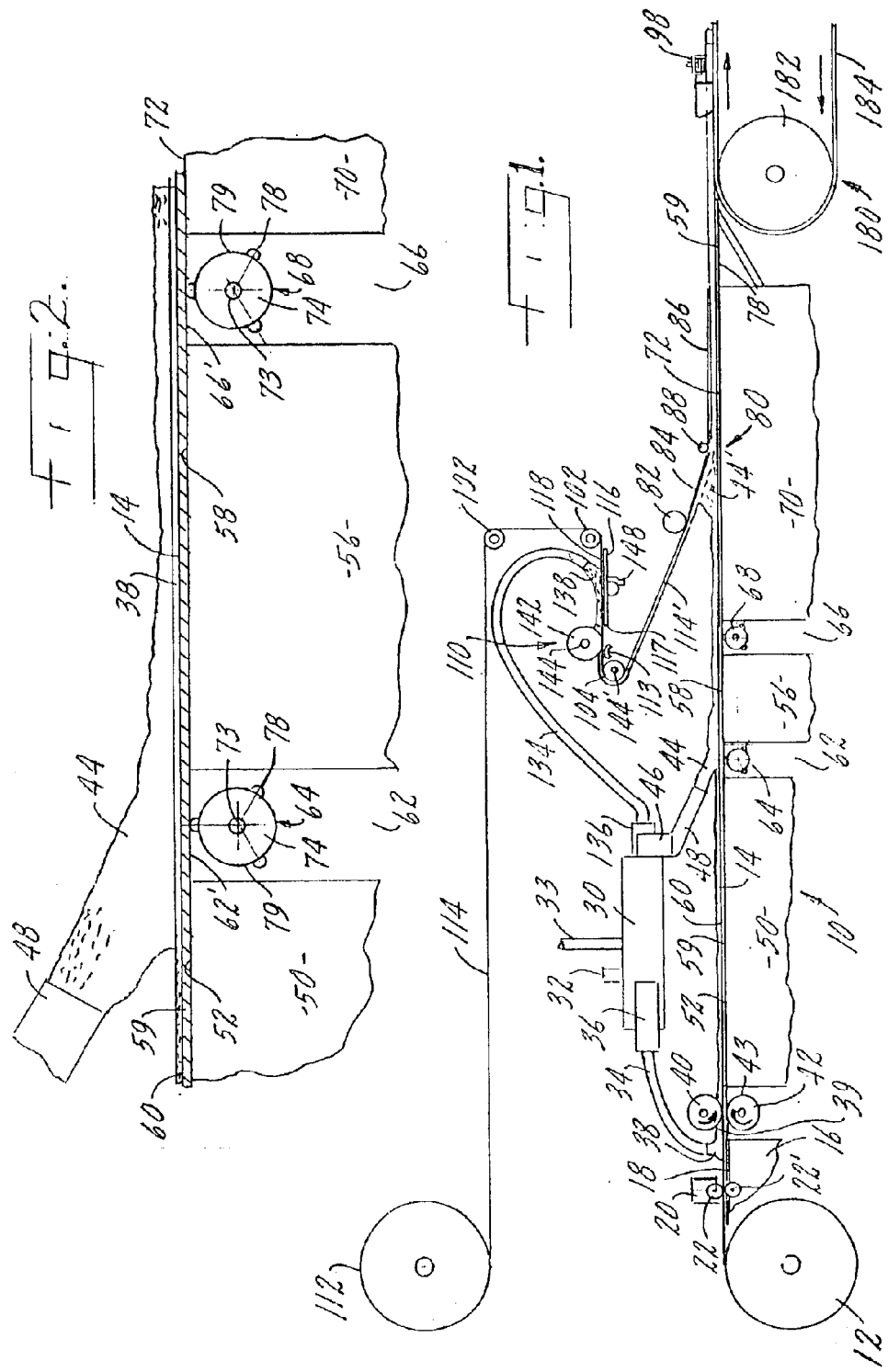

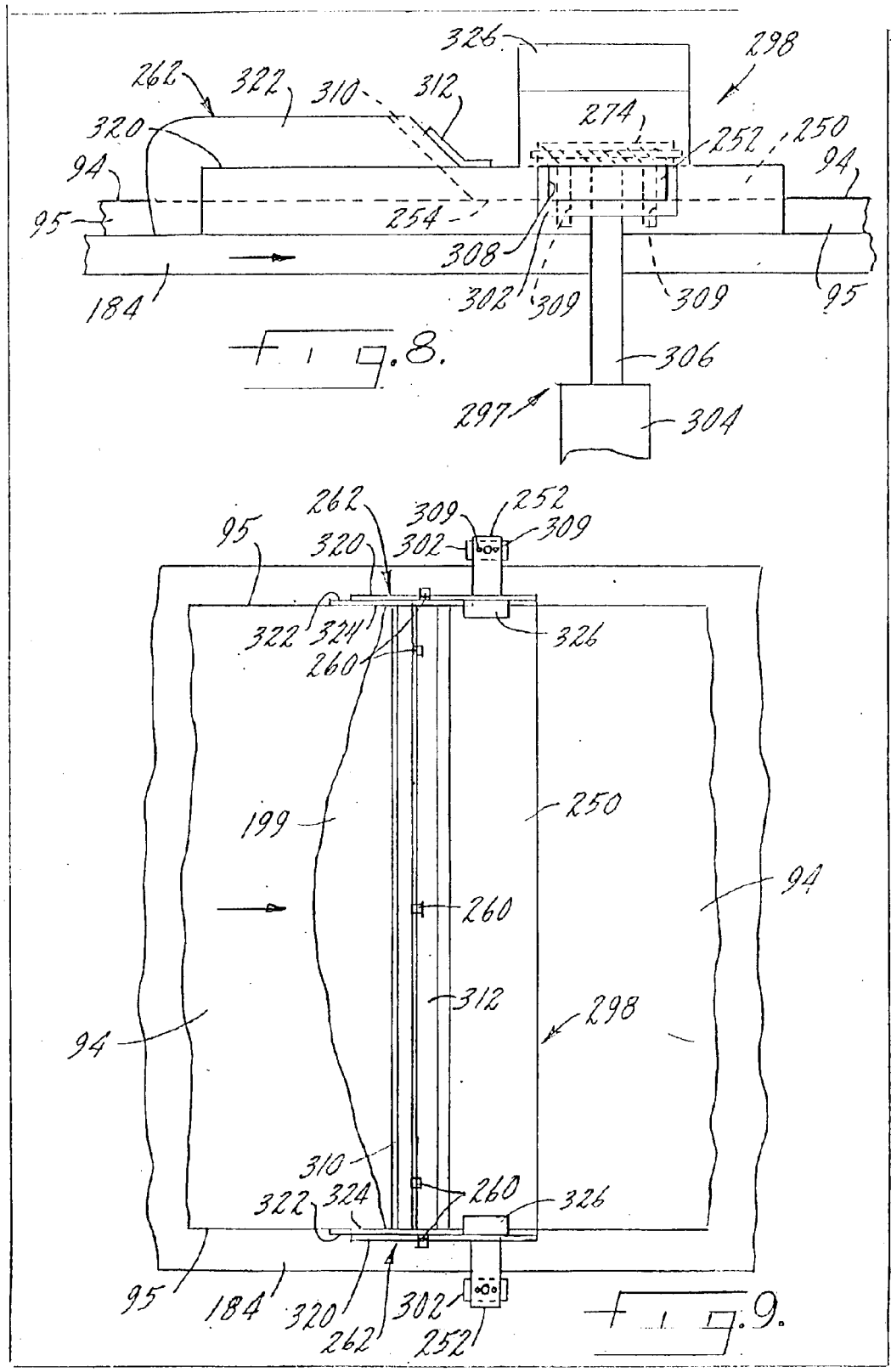

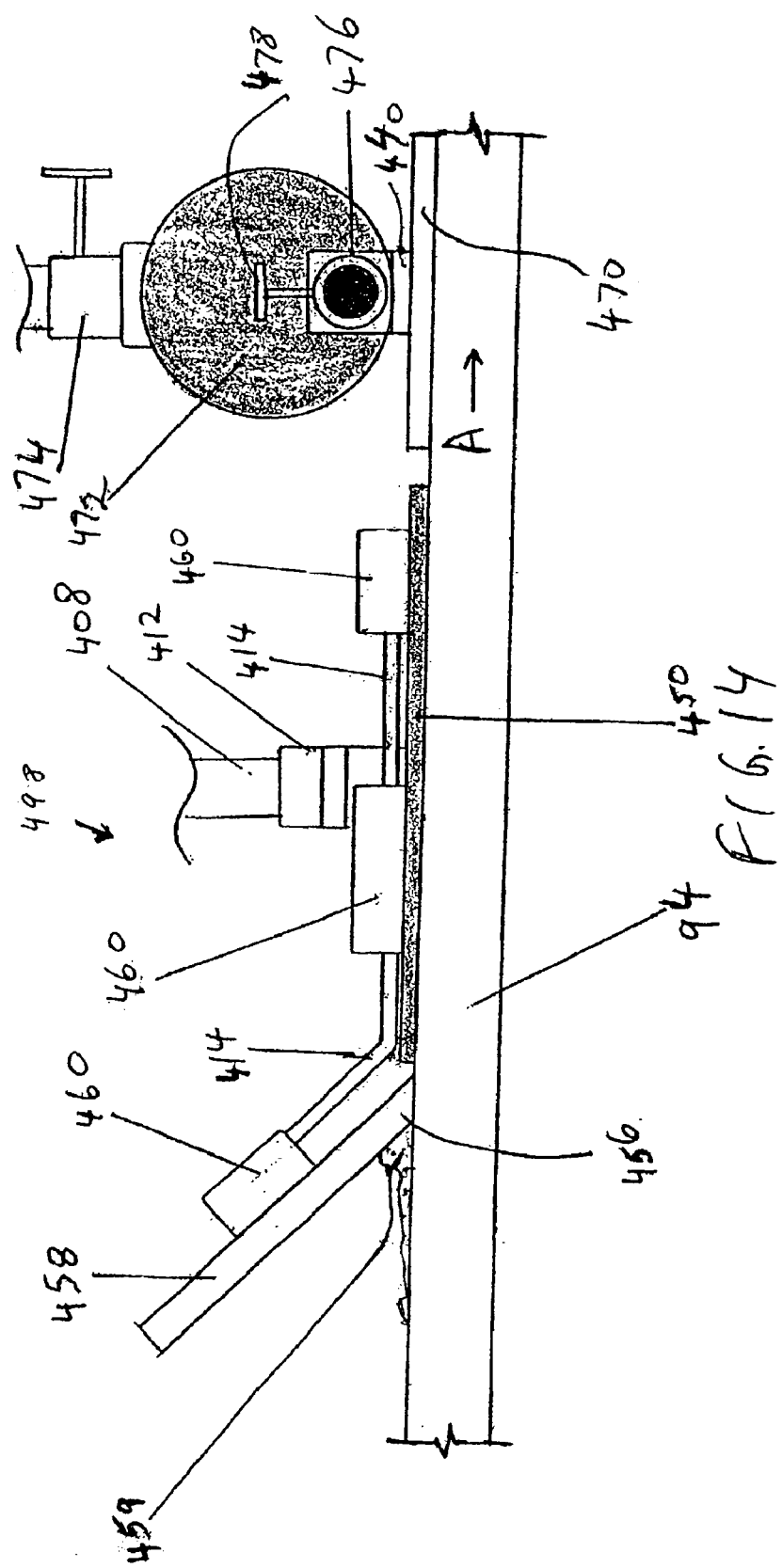

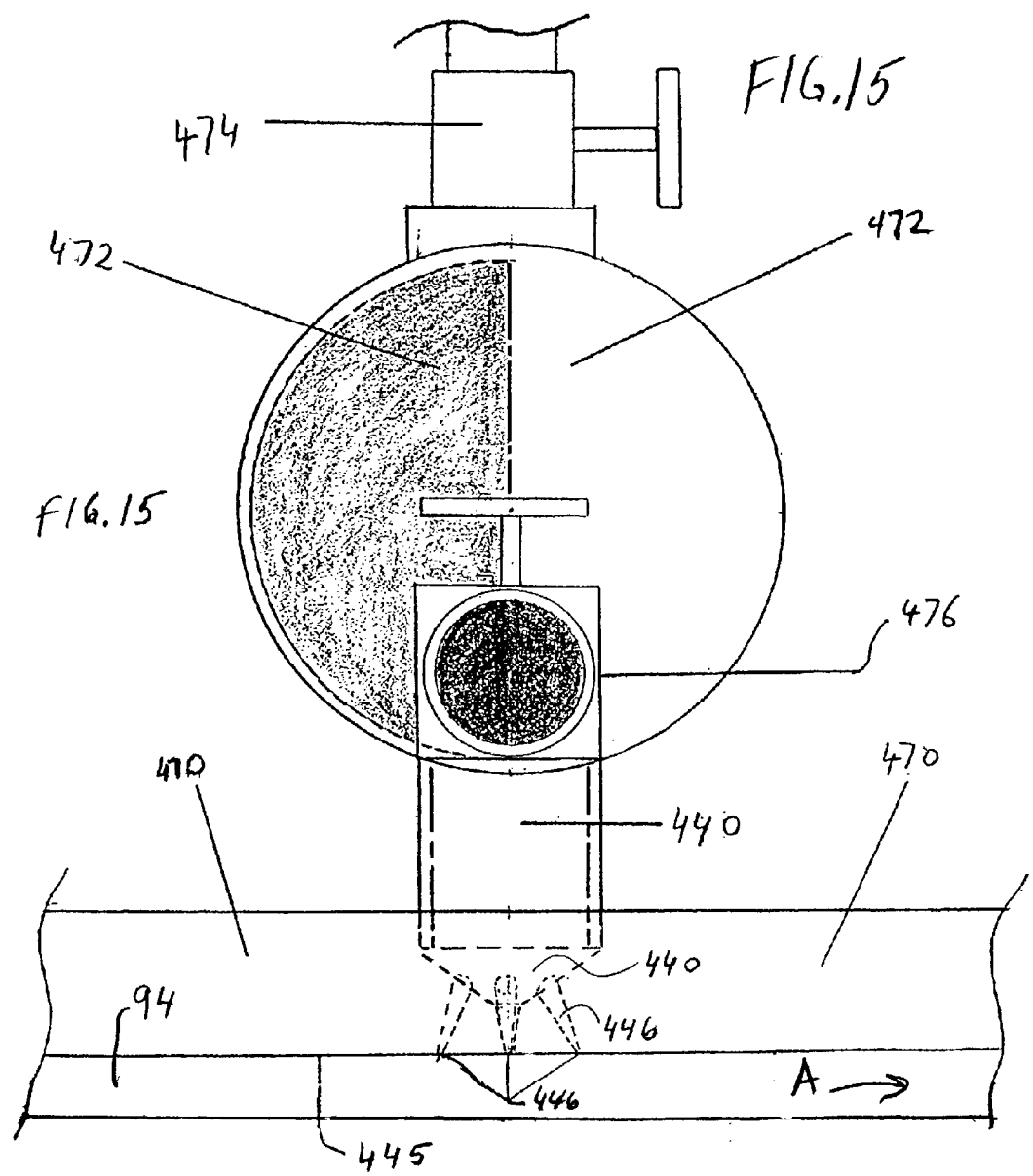

GYPSUM BOARD FORMING DEVICE

CROSS-REFERENCE TO RELATED APPLICATIONS

This is a continuation-in part of U.S. patent application Ser. No. 09/875,733, filed on Jun. 6, 2001 now U.S. Pat. No. 6,524,679.

BACKGROUND OF THE INVENTION

1. Field of the Invention

This invention relates generally to gypsum board and its manufacture, and more specifically, relates to gypsum board having at least one face or surface capable of receiving and adhering to polymeric coatings and that is manufactured quickly and efficiently.

2. Background Art

Gypsum board, and its production, has received attention in the building industry, and especially for providing an easily worked building material the consistency of which is available for general construction use. Desirable characteristics for gypsum board also include a smooth working surface, consistent thickness throughout, and the ability to provide finishing enhancements, such as paint or other protective coverings, thereon.

Recent developments in the manufacture of gypsum board have also added to the durability and versatility of the uses to which gypsum boards may be put.

A particularly useful development in the building board field is known as glass reinforced gypsum (GRG) board. GRG board and its manufacture are well known in the construction industry, and it is described in commonly owned U.S. Pat. No. 4,378,405, incorporated herein by reference. Products made according to U.S. Pat. No. 4,378,405 are sold by the common assignee, BPB, Ltd., under the name "Glasroc." GRG board, of generally conventional construction, is comprised of a gypsum core having a non-woven glass mat immediately below one or both principal surfaces. In the aforementioned U.S. Pat. No. 4,378,405, the mat is introduced into the core by vibrating the core slurry, which either overlays or underlays the mat, to cause the slurry to pass through the mat, so that the surface layer or layers of gypsum are integral with the core. GRG boards are considered stronger than conventional paper boards and exhibit superior fire resistance.

Manufacture of GRG boards compromises the need to provide strength by employing non-woven glass fiber mat or relatively low diameter (for example, 13 $\mu$m (0.005 inch)) fibers with the need to ensure efficient exhaustion of air through a mat from the gypsum slurry from which the board is formed. This is a particular problem at the edge margins of the board where the bottom mat is brought up and onto the upper surface of the board to define the edges of the uncut board. Inefficient exhaustion of air in this region can lead to voids in the edge margins of the cut boards, reducing the edge strength of the boards.

The problem of voids in the edge margins has been dealt with by increasing the fiber diameter of the mat, particularly the bottom mat (to, for example, 16 $\mu$m (0.0065 inch)), allowing easier exhaustion of air and penetration of gypsum slurry, but which consequently may result in a reduction of board strength.

Additional compromises in optimization between concerns of cost and of effectiveness arise from the amount of penetration of slurry through the glass mat fibers. In order to ensure that slurry penetrates essentially throughout the surface of the glass mat fibers, aforementioned U.S. Pat. No. 4,378,405 teaches the use of vibration, for example, by vibrators, as disclosed therein. The vibrators vibrate the glass mat and slurry composition to ensure that the "slurry penetrates through the fabric" of the glass mat fibers to form a thin continuous film on the outer surface of the glass mat fibers.

It has been found desirable to form a thin film of slurry on the outer face surface of the glass mat, to avoid exposed fibers of glass, and so to present a smooth working gypsum board surface that can be handled by construction workers without necessitating protective covering of the hands. It has been found that when gypsum boards with exposed glass fibers, such as those taught, for example in U.S. Pat. Nos. 4,647,496; 4,810,659; 5,371,989; 5,148,645; 5,319,900; and 5,704,179, are handled at a construction site by workers, exposed glass fibers penetrate the skin of uncovered hands, and this generally results in worker discomfort. It has been further found that later finishing, e.g., painting, of a smooth gypsum board surface is more desirable because the need for additional pro-finishing steps, such as priming, etc., may be minimized.

Manufacturing facilities for the production of gypsum board, whether or not glass mats are utilized for the structural facings, are capital intensive in the costs of space, equipment and in the down time during which a gypsum board production line is reconfigured. For production of a variety of gypsum board products, for example, standard paper faced gypsum board, glass mat backed board, etc., down time of the production line represents a significant cost in the delay of production of gypsum board and in time wasted by production workers who remain idle.

It has been found advantageous to provide a gypsum hoard production facility that is easily modified, without long periods of shutting down production, when a production line is being switched from the production of one type of gypsum board to another.

Another consideration in establishing a gypsum board production line arises from the long time required for gypsum slurry in liquid form to be formed, and to set up in a process known as hydration, then to be cut, then processed and dried to remove the water from the set gypsum. To perform the complete process takes a predetermined amount of time, which is an uncompromising restraint on the amount of gypsum board that can be processed on a gypsum board line.

To accommodate these concerns, standard gypsum board lines have been increased in length so that sufficient time elapses as the gypsum travels along the line to permit production, hydration and curing of the gypsum boards, while simultaneously increasing the output of gypsum board being produced on a single board line.

It is important for the board line to run at a sufficient speed, meanwhile maintaining the desired output of gypsum board, while also retaining the efficient operation and consistent quality of the gypsum board produced. Thus, the continuous feed of unset gypsum board is preferably matched with the speed of the conveyor belt as it takes up the gypsum board for the hydration and curing steps occurring down the stream from the gypsum board formation station. Efficient processes for gypsum board must use a production line, therefore that has a length dependent on the rate of desired production, so that the gypsum board becomes fully hydrated and cured at the end of the conveyor belt run.

Additional compromises in optimization between concerns of cost and effectiveness arise from the amount of penetration of slurry through the mineral or glass mat fibers when these are utilized as facing materials. In order to ensure that unset gypsum slurry penetrates essentially throughout the surface of the glass mat fibers, aforementioned U.S. Pat. No. 4,378,405 teaches the use of vibration, for example, by means of vibrators, as disclosed therein. The vibrators vibrate the glass mat and slurry composition to ensure that the "slurry penetrates through the fabric" of the glass mat fibers, to form a thin continuous film on the outer surface of the glass mat fibers.

It has been found desirable to form a thin film of slurry on the outer face surface of the glass mat, to avoid exposed fibers of glass, so as to present a smooth working surface of the gypsum board that can be handled without protective covering of the hands. It has been found that when gypsum boards with exposed glass fibers, such as those taught, for example, in U.S. Pat. Nos. 4,647,496; 4,810,569; 5,371,989; 5,148,645, 5,319,900; and 5,704,179, are handled at a construction site by workers, glass fibers penetrate the skin of uncovered hands and result in discomfort. It has been further found that further finishing, e.g., painting, of a smooth gypsum board surface, is made easier because the need for additional prefinishing steps, such as priming, etc., may be minimized.

Although the smooth surface of gypsum boards provided by the process utilized in aforementioned U.S. Pat. No. 4,378,405 has been found adequate, it is desirable that the operation of the gypsum board line be run quickly and with a more efficient use of available resources. Although the smooth surface of gypsum boards provided by the process utilized in aforementioned U.S. Pat. No. 4,378,405 is adequate to achieve the stated purposes, the process of manufacture, and especially the vibration steps, tend to slow down board production operation and to render the process useful only for specialized applications for which a customer is willing and able to contend with delays in production and in the consequential costs. Moreover, it is not possible to utilize the process of making GRG gypsum boards as taught by U.S. Pat. No. 4,378,405 in a standard gypsum board line because that process requires structural changes to the board production line, which may take time and capital to effectuate.

Another consideration that must be accommodated in terms of timing is the desirability of the gypsum slurry to penetrate through the glass fiber mat so as to produce a clean, smooth surface on the faces of the gypsum board, without unexposed glass fibers extending along the surface. The need to allow sufficient time for the gypsum slurry to penetrate through the mat also restricts the speed of the gypsum board manufacturing line.

It has been found desirable to provide a gypsum board and manufacturing process thereof which can be manufactured at relatively high speed, has high structural integrity and strength by virtue of using a mat of relatively low diameter fibers, and may include in a face coating a polymeric additive material providing a surface ideal for further finishing of the gypsum board. The production process for making gypsum board products according to this invention is capable of quick and efficient change over, for changing of the gypsum board production line, for example, from a board line producing paper faced gypsum board to one producing one or more gypsum boards described herein as embodiments of the gypsum boards according to the present invention.

The present invention can provide an inventive product by utilizing the process according to the present invention and the inventive gypsum board manufacturing facility can provide the capability to quickly change over from a standard plasterboard line, for example, which produces paper backed gypsum boards, to a process utilizing glass mats that become completely covered by a thin film of gypsum, according to the present invention, without requiring breakdown and rebuilding of the production line. The production line, according to this invention, further may be used to produce an embodiment of the present invention which includes a gypsum board having a surface that is relatively smooth and can be utilized or finished without other preparation.

SUMMARY OF THE INVENTION

Accordingly there is disclosed and claimed herein a method of manufacture of gypsum board having face sheets comprising inorganic fiber, preferably randomly oriented inorganic fiber, comprising the steps of depositing a predetermined amount of first gypsum slurry having a first consistency onto at least one continuous sheet of randomly aligned inorganic fiber material having random interstices between the fibers by passing at least one continuous inorganic fiber sheet through a gypsum application station, the station including two applicator wheels through which pass the inorganic fiber sheet, so as to cause the first gypsum slurry having a first consistency to penetrate through the random openings between the inorganic fibers and thereby to coat both top and bottom surfaces of the inorganic fiber material with the gypsum having a first consistency, directing the first inorganic material from the gypsum slurry application station to a first forming plate, depositing a second gypsum slurry having a second consistency on the first inorganic fiber material and causing the second gypsum slurry to be essentially evenly distributed over an upwardly facing top surface of the first inorganic fiber sheet, applying a third gypsum slurry having a third consistency to a second of at least one continuous inorganic fiber sheets, and causing the third gypsum slurry to penetrate essentially completely through random interstices in the second inorganic fiber sheet, applying the second inorganic fiber sheet onto the second gypsum slurry thereby sheathing the second gypsum slurry within the first and second inorganic fiber sheet to form a wet gypsum board, passing the wet gypsum board through a board forming station having a lower forming plate and an upper forming plate, the upper forming plate comprising sections and defining at least one predetermined angle relative to the lower forming plate, the vertical separation between the lower plate and at least one section of the upper plate having a predetermined vertical dimension substantially equal to the desired thickness of the manufactured gypsum board. Alternatively, a forming wheel may be utilized to provide gypsum board having a predetermined thickness. Optionally, an edger bar may be used to smooth and otherwise complete the surface finish of the gypsum board. In a second embodiment, the method includes adding one or more polymeric additives to the gypsum slurry of one or both surfaces.

In another embodiment of the present invention, a multilayer gypsum board comprising a first layer of set gypsum comprising a first layer of a mixture of set gypsum having an outer surface and at least one polymeric compound entrained within the set gypsum, and being impregnated within a thin sheet of randomly aligned inorganic fibers, the outer surface of the sheet being essentially encased within the set gypsum and polymeric compound, a second layer comprised of set gypsum, the set gypsum in the second layer being of a lower density than the set gypsum in the first layer; and a third layer having an outer surface comprising set gypsum impregnated with a second thin sheet of randomly aligned inorganic fibers, the outer surface of the third sheet being essentially encased within the set gypsum of the third layer; the set gypsum in the first layer being integrally bonded to the gypsum of the second layer and the set gypsum in the second layer being bonded integrally to the gypsum in the third layer.

BRIEF DESCRIPTION OF THE DRAWINGS

FIG. 1 is a diagrammatical, cross-sectional view of the gypsum board forming station according to the present invention;

FIG. 2 is a detailed, cross-sectional, diagrammatical view of the vibrator sub-assembly shown in FIG. 1;

FIG. 8 is a side view of a second embodiment of an edger flapper assembly feature according to the present invention;

FIG. 9 is a top view in detail of the edger flapper bar shown in FIG. 9;

FIG. 14 shows in a detail elevational view the final forming apparatus in greater detail; and FIG. 15 shows a detailed cutaway elevational view of a portion of the final forming apparatus.

DETAILED DESCRIPTION OF THE PREFERRED EMBODIMENTS

Figure 3:
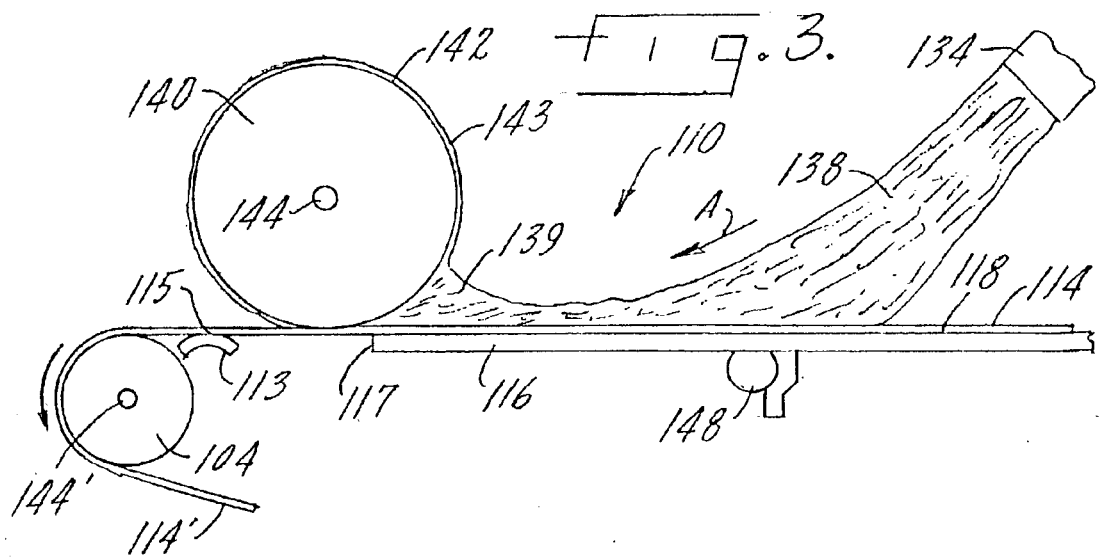
FIG. 3 is a detailed, cross-sectional, diagrammatical view of FIG. 1, showing the top sheet sub-assembly according to the present invention.

In the diagrammatical, cross-sectional illustration of FIG. 1, the board forming station 10 of an inventive embodiment of the inventive plant is shown. Although illustrated in cross section, the station 10 is shown diagrammatically to clearly depict the separate elements in relation to each other. Modifications to the arrangement are possible and distances between the separate elements are not to scale for simplicity of illustration, but a pragmatic and efficient arrangement will come to mind to a person having ordinary skill in the art.

The inventive plant 10 comprises a supply roll 12 that provides feed of a continuous sheet of facing material that, in the arrangement shown, defines a bottom-facing sheet 14.

The supply roll 12 may feed out a sheet comprising any conventional material used in gypsum boards, for example, paper or paper board, but for purposes of the present invention, the material of bottom facing sheet 14 preferably comprises a mat of long inorganic, e.g., glass, fibers which will be more clearly described below with reference to the formation of the inventive gypsum board product, when the inorganic fibers comprise a glasso-glassive fiber, the products being, sometimes referred to herein as glass reinforced gypsum ("GRG") boards.

The supply roll 12 pays out the continuous bottom facing sheet 14 over a first forming table 16, having an upwardly facing surface 18, provides a working surface for further processing of the bottom facing sheet 14. The first forming table 16 also provides a support for creaser wheel assembly 20, disposed athwart the surface 18.

The sheet 14 may be extracted from the supply roll 12 by motion of the sheet being pulled through the board forming station 10 by the belt line, as will be described. The two creaser wheels are vertically disposed within the creaser wheel assembly 20, one set of wheels 22 above the bottom facing sheet 14 cooperate with a second set of wheels, referred to as the wheel anvil 22', below the sheet 14. The creaser wheels 22, 22' rotate on axles and produce partially cut edge creases on the sheet 14 adjacent to each of the longitudinal edges of the bottom-facing sheet 14. The edge creases are spaced to allow varying fold thicknesses and to cause the edges to turn upwardly so as to retain slurry poured onto the bottom-facing sheet 14 downstream of the creaser wheel assembly 20, as is described below.

A continuous mixer 30, accepting raw materials, i.e. stucco, plaster, gypsum (in powder form), water and other additives, through one or more inlets, one of which inlets 32 is shown in FIG. 1. The mixer 30 provides a mixing capacity that formulates a desirable density of wet gypsum slurry by, for example, rotating a mixing blade (not shown) via a drive shaft 33. Because it is a desirable feature for this invention to produce a multi-layer gypsum board, the mixer 30 may comprise separate mixing chambers (not shown in FIG. 1) for providing separate, and different slurry mixtures. A continuous mixer, such as that utilized in this invention, is described and illustrated in commonly-owned U.S. Pat. No. 5,908,521, which is incorporated by reference as if fully set forth herein.

The continuous mixer 30 thus provides several outlets for gypsum slurry each having varying desirable characteristics depending on the function of the slurry layer for which any specific outlet is producing gypsum slurry. Each outlet includes an output control for controlling the amount of gypsum slurry permitted to flow through the outlets and into the gypsum board forming plant. The control may be one or more slurry delivery mechanisms, as described in aforementioned U.S. Pat. No. 5,908,521, which have controlled variable delivery speeds so that only the desired amount of gypsum slurry is pumped through the outlets.

Referring again to FIG. 1, mixer 30 comprises a first slurry outlet 34, controllable by a control device 36, that allows for the continuous flow of a slurry mixture having desirable characteristics, as described in aforementioned U.S. Pat. No. 5,908,521. In this embodiment, mixer 30 is set to provide two types of slurry. Control device 36 delivers a denser gypsum slurry mixture that is ultimately utilized adjacent the facing of the completed gypsum board, as will be described below.

The end of the slurry outlet 34 extrudes the gypsum slurry directly onto the bottom-facing sheet 14, which is continuously moving over the surface 18 of forming table 16. Slurry outlet 34 preferably comprises a rubber boot, but other types of outlets may be used, for example flexible hoses or piping. Preferably, the gypsum slurry 38 is poured onto the upwardly facing surface of the sheet 14 at a position where it is supported by the forming table surface 18, and a predetermined amount of dense gypsum slurry is deposited over the continuously moving sheet 14 so as to coat the internal surface of bottom face sheet 14. It should be noted that this upwardly facing internal surface of sheet 14 is normally destined to be an inner surface of the bottom-facing sheet 14, and will be facing inwardly from the board surface when the gypsum board is fully formed. To ensure that the dense gypsum slurry 38 is evenly spread out over the top surface of the bottom face sheet 14, a set of roller wheels 40, 42, also referred to herein as roll coaters 40, 42, are positioned again vertically over and under the sheet 14. The wheels 40, 42 can rotate in forward or reverse directions.

One advantage and benefit which derives from use of rotating roller wheels 40,42 is that in addition to providing a smooth, evenly spread surface coating over the mat comprising the bottom facing sheet 14, the dense slurry layer 38 deposited on the inner mat surface is forced, by the top roller wheel 40, to extend through the sheet 14 and to form a structurally integral surface. The surface layer of gypsum slurry 38 may be modified to include additives, such as an engineered polymer, to provide structural strength and load carrying capability to the gypsum board product. As will be described, the optional polymer additive may also present a polymer matrix that provides a water impervious surface having desirable performance characteristics, such as, plastic sheathing, or water repelling, properties so as to expand the possible uses of the gypsum board products to both indoor and outdoor use.

In a preferred embodiment of the invention, the material comprising the bottom-facing sheet 14 is a mat of randomly aligned mineral, e.g., glass, fibers, having an average fiber diameter of 13–16 $\mu$m (0.005–0.0065 inches), and including a binder to hold the glass fibers in the form of a glass fiber mat having a desirable thickness. Such glass fiber mats are known for use in the production of gypsum board, for example, see aforementioned U.S. Pat. No. 4,378,405 and WIPO Publication No. WO9809033 (European Patent No. EP 0 922 146). Use of a mineral fiber mat, which is porous to water generally, provides added structural strength to the gypsum board. The porous nature of the mineral fiber mat also permits gypsum slurry to penetrate through the pores between the mineral fibers and to permeate so as to cover both the top surface and through slurry penetrating the bottom surface of bottom facing sheet 14 because of slurry penetration. Thus, as the bottom facing sheet 14 passes through the roll coaters 40, 42, the unset higher density gypsum 38 is coated over the mineral fibers and is forced in the roll coating process to penetrate through the bottom facing sheet 14 and coat each of its top and bottom surfaces with an unset denser gypsum layer 38. Ideally, the highdensity gypsum 38 is forced to penetrate 100% through the glass mat sheet 14, although manufacturing tolerances may permit penetration of approximately 95–98%.

In a preferred form, the roll coaters 40, 42 cause penetration of the unset denser gypsum slurry 38 to coat the bottom surface of the glass mat bottom sheet 14. This bottom surface of the bottom-facing sheet 14 will ultimately become the facing surface of the completed gypsum board products. Preferably, the unset gypsum slurry 38 is caused to form a dam 39, which then impregnates a continuous layer of unset gypsum through to the bottom surface of the glass mat 14 to form a dense slurry gypsum layer having a thickness that is in a range from approximately 0.01 to 2.0 mm, as measured from the outermost surface of glass mat 14. Although penetration of the slurry 38 may not result in a continuous layer having a discrete thickness, nevertheless the process preferably will result in each of the glass fibers, comprising the glass fiber mat 14, in being coated on its surface so that very few or no exposed uncoated glass fibers remain.

The speed of rotation of the rollers 40,42 may be adjustable depending on the viscosity of the density of gypsum slurry 38, the speed of linear travel of the glass fiber mat 14 and the amount of the gypsum slurry 38 to be applied to the mat 14. In effect, the roll coaters 40, 42 serve to deliver the slurry 38 through the small random openings between fibers of mat 14 and deposit the material on the top of the fabric web in greater or lesser amounts, as desired, filling the openings and coating both the bottom face as well as the top face of mat 14.

Although the roll coaters 40, 42 are shown rotating in the direction of travel of the bottom facing sheet 14, it is possible, and in some embodiments of this invention, desirable to have the roll coaters rotate in the opposite direction from that shown in FIG. 1. In such case, a mechanism such as a forming belt line, disposed downstream of the roll coaters 40, 42, described below, is utilized to provide a motive force for pulling the bottom facing sheet 14 through the gypsum board forming station 10, even against the reactive forces produced by counter-rotating coater rolls. Of course, alternatively, other means may be utilized at different locations in the processing production line to provide the motive force for moving the sheet 14 through the station 10, for example, another set of rollers downstream (not shown) that pull the mat 14 toward the right. It should be noted that the gypsum slurry layer on the top surface of bottom facing sheet need not be absolutely level or completely even since subsequent steps in the process may provide additional smoothing opportunities, as will be described below.

Gypsum board with mineral fiber facing sheets may be produced in multiple layers, including, but not limited to, a strong, more dense upper and lower surface layers and a less strong and less dense middle layer or core. The layered structure is advantageous as it allows the gypsum board to have a reduced weight, without sacrificing the composite structural strength of the final gypsum board product. Thus, and in accordance with the teachings of aforementioned U.S. Pat. No. 5,908,521, the continuous mixer 30 is configured to provide a second, less dense gypsum slurry, referred to as core gypsum slurry 44 or simply slurry 44, which comprises the bulk of the material in the finished gypsum board products. The core gypsum slurry 44 is pumped out of the mixer 30 by a control device 46 and through an outlet 48, which may comprising a rubber boot or hose. A continuous layer of the unset slurry 44 is caused to form onto the laterally moving combination bottom facing sheet 14 and layer of dense slurry 38.

The core slurry 44 may comprise a different composition of constituent material than the dense gypsum slurry 38, for example by the addition of filler or strengthening additives, as is known, or may simply comprise the same constituent elements but may have a lighter or less dense consistency because the gypsum slurry 44 contains foaming materials therein, which are not added to the dense slurry 38. It is known that a longer mixing time for the unset gypsum causes more of the entrained air bubbles, sometimes referred to as foaming, to reach the surface of the unset gypsum and thus to be removed from the unset gypsum slurry material. It is the greater amount of air, entrained as miniscule air bubbles, which gives rise to the lighter, less dense core gypsum slurry 44.

Gypsum slurry, and especially gypsum slurry that has been modified with polymer additives, has adhesive characteristics in its wet state that present some difficulty in handling. Accordingly, a film coating 43 is preferably provided on at least one of the roll coaters, preferably roll coater 42, which allows for easier continuous separation of the coater wheel surface from the surface of the wet gypsum surface while simultaneously depositing the majority of the gypsum slurry 38 on the mat of sheet 14. Materials for such a film coating surface include appropriate polymers, such as a Teflon® coating, that are capable of providing a firm surface yet avoiding gypsum slurry adhering or clinging to the surface of the roll coater wheels.

Another important reason for providing a denser slurry layer, in conjunction with a lighter core slurry layer in the gypsum board, is that the boundary between the dense slurry layers 38, and the core slurry layer 44 provides an inhibiting barrier that serves to control and inhibit the migration of the polymer additives from the surface dense slurry layer 38 to the core slurry layer 44. This migration is most likely to occur during the conventional heat rendering process, described below, used for drying the finished board product. The resulting board product is rendered better equipped to retain the polymer additives in the surface dense slurry layer 38, which thus form a better, more uniform polymer matrix base or "root system" for co-polymer formation with finishing products, as is described below.

As the dense gypsum layer 38 dries and cures, the polymer additives entrained therein migrate toward and through the underlying fiber facing sheet 14 and the migration may extend into the core slurry layer 44 in the form of tendrils or roots that provide for a greater integrity in the bond formed between the core gypsum layer 44, the fiber sheet 14 and the overlying dense slurry layer 38. Moreover, because the lighter gypsum layer 44 includes an entrained foam, and the dense slurry layer 38 does not, the penetration of the additive materials is deeper into the layer 44. This bonding produced by the impregnated additive polymeric material improves matrix formation, ultimately improving the surface hardness and structural integrity of the finished gypsum board, and provides a strong outer shell to the board and also improves the load bearing capacity, contributing to its flexibility.

Referring again to FIG. 1, after passing through the roll coaters 40, 42, the bottom facing sheet 14 passes onto a second forming table 50 having a horizontal forming surface 52. Although the first forming table 16 and second forming table 50 are shown as separate tables in the diagrammatic rendition of FIG. 1, it is possible and in certain cases preferable, that the forming table comprises one elongated table (not shown) with several cutout portions within which, for example, the creaser wheel assembly 20, or the roll coaters 40, 42 and vibrators, are mounted.

To facilitate the transport of the bottom-facing sheet 14, including the weight of the dense slurry 38 and core slurry 44, a non-stick table deck 59 is disposed over the surface 52 of table 50. Referring now to FIG. 2, which is a detailed view of FIG. 1, an upwardly facing surface 60 of table deck 59 provides a working surface for the production of gypsum board. Preferably, the table cover comprises a smooth, non-stick material, such as stainless steel, an elastomeric material, e.g., rubber, or a polymeric material, e.g., Formica®, and is of sufficient structural strength to support the moving weight of the slurry 44 deposited on the table 50.

As is evident in the detailed cross-sectional view of FIG. 2, the table deck 59 rests directly on surface 52 of table 50, so that as the core slurry 44 is deposited on the bottom facing sheet 14, the weight of the slurry 44 places downward pressure on the sheet 14, resulting in flattening of the under surface of the sheet 14 against the surface of the table deck 59. However, because of the smooth, non-stick characteristics of the table deck 59, the bottom facing sheet 14 and slurry 38, 44, freely traverse over the forming tables, as described below.

The cross-sectional view of FIG. 1 also does not show the width of the outlet spouts 34 and 48. Various known configurations may be utilized, including an elongated spout that is disposed transversely to the direction of board travel. Such spouts may output a sheet of gypsum slurry across the width of the mat 14. Alternatively, a tubular spout attached to a rubber boot (as shown) deposits a continuous stream of gypsum slurry onto the glass fiber sheet 14. That gypsum slurry stream may then be spread out, before reaching the roll coaters 40, 42, to provide a smooth surface over the sheet 14 by, for example, diagonally angled vanes (not shown) or by specially constructed rollers or a dam that spread the gypsum slurry from the center toward the edges of bottom sheet 14. The exact shape of the spouts is not considered to be critical to this invention, as long as the function is achieved of evenly spreading the gypsum slurry over the entire width of the mat of both the bottom and top sheets.

The unset, less dense core gypsum slurry 44 is deposited on the penetrated bottom facing sheet 14 at or adjacent a third forming table 56, having a top surface 58, for supporting the combination of penetrated mat 14 and slurry 44. An opening 62 between the second forming table 50 and third forming table 56 provides a space for disposing a first deck vibrator 64, and another opening 66 provides for mounting a second deck vibrator 68 between the third forming table 56 and a fourth forming table 70, having a top surface 72. Such vibrators are described in U.S. Pat. No. 4,477,300, which is incorporated by reference herein.

As shown more clearly in the detailed view of FIG. 2, the table deck 59 extends between the first and second forming tables 50, 56 over the opening 62, and also between the third and fourth forming tables 56, 70 over the opening 66. Because each of the tables 50, 58, 70 are disposed so that their surfaces 52, 58, 72 are coplanar, the table deck 59 mounted onto the table is vertically fully supported across essentially the full length of the gypsum board forming station 10, i.e., across the full length defined by second to fourth forming tables 50, 56, 70.

Shown in FIG. 2, deck vibrators 64, 68 each comprise rolls 74, which are mounted immediately adjacent sections of the table deck 59 covering the upper portion of the respective openings 62, 66. Each of the deck vibrator rolls 74 are mounted to rotate around axles 76, both extending horizontally in a direction transversely to the direction of travel of the board production line. Each of the rolls 74 has a diameter that is just slightly less than the radial distance between each axis 76 and the bottom surface 62', 66' of the table deck 59 covering the respective openings 62, 66.

Each deck vibrator 64, 68 further comprises a plurality of bumps 78 which extend radially beyond the outer surface 79 of the deck vibrator rolls 74. Bumps 78 extend longitudinally along the surface 79 of the rolls 74 in a direction parallel to the axis 76. As the deck vibrator rolls 74 rotate about axis 76, the bumps 78 routinely strike the underside surfaces 62', 66' of the table deck 59, which momentarily lifts the table deck 59, together therewith the bottom facing sheet 14 and slurry 38, 44, combination, which agitates the slurry resting on sheet 14. Such agitation causes the slurry 38 to even out over the upper surface of the penetrated mat 14 and also causes the slurry 44 to more completely permeate through and bond with the denser slurry 38 located on the upper surface of the bottom facing sheet 14.

Another feature provided by the deck vibrators 64,68, is the "kneading out" of larger entrapped foam air bubbles from the bottom surface of the bottom facing sheet 14. As the bottom-facing sheet 14 passes over the openings 62, 66, the denser slurry 38, which has penetrated through the mat of bottom facing sheet 14, is still unset and continues to have entrained air bubbles within the gypsum slurry and adjacent bottom sheet surface. Vibration from the deck vibrators 64, 68, causes these foam bubbles to reach the surface and exit from within the penetrated gypsum slurry 38, thus resulting in a smooth outer surface of the completed gypsum board when the manufacturing process is completed, as in aforementioned U.S. Pat. No. 4,477,300.

Completion of the smoothing operation of the slurry 44, resulting in an essentially planar combined bottom facing sheet 14 and core slurry 44 is further facilitated by a forming plate in the top and bottom sheet joining station 80 (FIG. 1), disposed downstream, i.e., toward the right as seen in FIG. 1, of the deck vibrators 64, 68. The forming plate assembly of sheet joining station 80 operates in conjunction with a top facing sheet 114 formed by the sheet coating station subassembly 110 having similar elements to those in the main production line that form the bottom-facing sheet 14.

Top-facing sheet 114 is comprised of a sheet or mat of randomly aligned mineral fibers, such as glass fibers, and is unrolled from a supply roll 112, similar to the supply roll 12. Similar elements to those used for the production of bottom facing sheet 14 are identified by like numerals in the 100 series, utilizing the same two last digits as those identifying the like elements in the production of the bottom sheet 14. Supply roll 112 pays out a continuous top facing sheet 114, which, in the completed gypsum board, will be adjacent the inner facing surface of the gypsum board product subsequently used in wall construction.

As shown in FIG. 1, the top facing sheet 114 may require feeding through various loops around, for example, rollers 102, so as to avoid interference of the main production line by the operation of top sheet sub-assembly 110. Top sheet sub-assembly 110 directs the top facing sheet 114 over a top sheet forming table 116 having an upwardly facing surface 118.

The continuous mixer 30 further comprises a slurry outlet 134 being controllable by a control device 136 providing a continuous stream of denser gypsum slurry 138 to the sub-assembly 110 for deposit onto the top facing sheet 114, as shown. A detailed cross-sectional view of the top sheet production station portion of sub-assembly 110 is illustrated in FIG. 3, and reference is now jointly made to FIGS. 1 and 3. Although in FIG. 1, the preferred embodiment of two separate slurry controllers 36, 136 are shown for supplying two different slurry mixtures 38, 138, for respectively, the bottom facing sheet 14 and the top sheet 114, it may be desirable to have one mixer discharge leading to dual controllers for controlling the discharge of two or more outlets, similar to that described in aforementioned U.S. Pat. No. 5,714,032. Alternatively, a single controller (not shown) may be used with the discharge outlets having individual valves enabling variable flow of gypsum slurry that is controllable for each outlet spout depending on the operational needs of the board production process.

Shown in FIG. 1, are separate controllers 36, 46, 136, each for controlling the output of a single outlet, i.e., dense gypsum slurry outlets 34, 134, or core slurry outlet 48. The configuration of the continuous mixer 30 provides separate mixing chambers, each attached to, and feeding gypsum slurry to, a separate outlet, which provides a specific type of gypsum slurry, as needed. Customization of the slurry provided to each of the outlets 34,48, 134 thus enable a gypsum board line operator to provide different slurries, having desirable characteristics, to the location in the manufacturing line where needed. For example, an outlet, such as outlet 34, may be required to provide a denser gypsum slurry, such as slurry 38. The slurry may be desired to include specified additives, for example, a polymeric compound, which forms a matrix with the set gypsum after it sets, so as to provide a suitable surface for further finishing, as will be described below. However, if it is only necessary for the front facing surface to have such a surface, then using the embodiment shown in FIG. 1 provides the option to include the additive in only the dense gypsum slurry 38, pumped from controller 36, but not to include such an additive in the slurry 138, which will end up on the inner, back side of the gypsum board during construction. Alternatively, the gypsum slurry 138 is denser than the core slurry 44, and may have an identical consistency as that of the slurry 38 coating the bottom facing sheet 14.

Referring again to FIGS. 1 and 3 showing the top sheet slurry coating station 110, the dense gypsum 138 is deposited on the top facing sheet 114, comprised of a mat of glass fibers, which is moving in the direction shown by arrow A, past the surface of the top sheet slurry table 116. The top sheet is moving essentially at the same rate as that of the bottom facing sheet 14 traveling over forming table 16. The gypsum slurry 138 is denser than the core slurry 44, and may have an identical consistency as that of the slurry 38 coating the bottom-facing sheet 14.

The top facing sheet slurry coating station 110 comprises a short forming plate 116, similar to the forming table 16, with the exception that the linear dimension of plate 116 is much shorter, having a sufficient length to achieve deposition of the gypsum slurry 138 and to spread out the slurry over the surface of the moving top facing sheet 114 between the lateral edges of the continuous sheet 114. To assist in the process of spreading the gypsum slurry 138 over the surface of sheet 114, one or more pneumatic table vibrators, such as vibrator 148, may be included to vibrate the surface 118 of the table 116.

The mechanism for coating the top facing sheet 114 is modified somewhat from that of the bottom facing sheet 14 because the linear dimension taken up by the top sheet roll coater station 110 is reduced to a minimum. The linear dimension of the station 110 is reduced so as to accommodate disposition in the space directly above the main forming and working tables 16, 50, 56, 70. Such accommodation is seen, for example, in including two roll coaters horizontally displaced from each other so that the top facing sheet 114 is coated by roll coater applicator wheel 140, and then pulled toward transition roll 104.

Applicator wheel 140, having a cylindrical surface 142, rotates about an axle 144, which axle 144 extends transversely to the direction of travel of the sheet 114. The vertical and horizontal disposition of axle 144 is important in obtaining the desired result of sheet 114 being fully impregnated with the dense slurry 138. As shown in FIG. 3, axle 144 is disposed linearly at a very short distance past the edge 117 of table 116. The axle is vertically disposed just slightly less than the radius of wheel 140 above the table surface 118 so that the applicator wheel 140 extends into the space under the plane defined by the table surface 118. As is shown in FIG. 3, during production the applicator wheel 140 puts downward pressure on top facing sheet 114, which sheet is deflected some slight distance from its linear path followed across the table surface 118.

The dense gypsum slurry 138 being deposited on the moving top facing sheet 114' produces a slurry concentration at a dam 139, comprised of excess dense slurry 138, which collects in the constricted space between the applicator wheel 140 and the top facing sheet 114. The size of dam 139 can vary, depending on the desired characteristics of the resulting impregnated top facing sheet 114' that is produced by the top sheet coating station 110. For example, if a greater degree of coating is desired to provide greater structural strength of the gypsum board, then the size of the dam 139 may be adjusted so that a greater amount of dense gypsum slurry is impregnated into the interstices between the mineral fibers of the mat comprising top facing sheet 114. For purposes of distinction, top facing sheet 114 is designated as impregnated top facing sheet 114' after impregnation by the dense slurry 138.

The size of the dam may be adjusted by varying any of a number of different parameters of the materials and devices of the top sheet coating station 110. Among the variable parameters that can be adjusted that will affect both the size of the dam 139 and the degree of coating produced by the applicator wheel 140 are the linear speed of the moving top facing sheet 114, the amount of dense gypsum slurry 138 deposited, the direction and speed of rotation of the applicator wheel 140, and the vertical and horizontal dispositions of the axle 144 relative to the table surface 118 and the edge 117, respectively. These adjustments may be utilized to produce the desired amount of dense slurry impregnated into the top facing sheet 114, the amount of dense slurry 138 that penetrates through sheet 114 to coat the "bottom" surface of sheet 114, i.e., the surface closest to the table surface 118, and the weight of and rigidity resulting from the final impregnated top facing sheet 114' produced at the top sheet coating station 110.

Working in conjunction with the applicator wheel 140 is downwardly curved transversely extending directional plate 113, upon which the sheet 114 impinges as it exits from contact with the applicator wheel 140. The directional plate 113 is preferably mounted so that the apex 115 is adjacent or within the plane defined by the surface 118. This positioning causes the sheet 114 to be placed into tension as the applicator wheel 140 pushes the sheet 114 downwardly from the plane, which disposition assists in the penetration of the gypsum slurry 138 through the mat of sheet 114. To inhibit the formation of slurry 138 on the surface 142 of applicator wheel 140, an appropriate thin film coating 143, comprising, for example, a Teflon® coating, may be optionally disposed on the surface of wheel 140, similar to the coating 43 of roll coater 42 described above.

The top sheet 114', impregnated with the dense gypsum slurry 138, is directed from the applicator wheel 140 to a second roller wheel, the transition roller wheel 104, having an axle 144' that is parallel to axle 144. The transition roller wheel 104 is in the general path and in the plane defined by the surface 118, and its function is to change the direction of travel of the top facing sheet 114' so as to render the top surface of the sheet to become the bottom surface, and vice versa. That is, the surface of the top facing sheet 114 that was on the bottom adjacent the surface 118, becomes the top surface and the sheet 114' is ready for delivery to and joining over the core slurry 44, as is described below.

Sheet joining station 80 comprises a circular pin 82 for receiving the impregnated top facing sheet 114,' and a forming plate comprised of a first forming platesection 84, and a second forming plate section 86, joined to each other at an appropriate juncture 88, as shown. The forming plate is mounted directly above the primary board production line, and provides the function of joining the top facing sheet 114' to the core slurry 44 disposed on the bottom facing sheet 14.

Circular pin 82 extends laterally across the width of the top facing sheet 114', which is directed from the transition roller wheel 104 so as to come into contact with the pin 82. Pin 82 is attached, either integrally or by an appropriate attachment mechanism, to the first forming plate section 84 so that there is a seamless transition experienced by the top facing sheet 114' as it comes down from the top sheet coating station 110. Forming plate section 84 is disposed at an angle to the primary board production line and to the surface 72 of the forming table 70. The angle between forming plate section 84 and the surface 72 may be adjustable, may be provided with preset angular value so as to provide a constriction for retaining a slurry head 44' during the production process, as shown. This angular constriction operates in a similar way as that of the constriction between the applicator wheel 140 and the forming plate 116 to collect an excess of core slurry 44 and thus produce a slurry head 44' at the sheet joining station.

The slurry head 44' provides the function of collecting core slurry 44 at the head 44' that provides a continuous supply of slurry to fill in the gap between the top sheet 114' and bottom sheet 14, and assists in avoiding air gaps or voids in the final gypsum board between the two facing surfaces. Once the faces are joined by the intervening core slurry 44, the top face sheet 114' has become inverted by transition roller wheel 104 so that its bottom surface, that which was immediately adjacent the surface 118 of forming table 116, has become the top surface 94 of the processed gypsum board, as shown.

The slurry head 44', because of the angular constriction between the forming plates, continually forces the slurry 44 to be injected into the constricted space adjacent the hinge 88, and so to create an additional pressure on the dense slurries 38, 138, impregnated into the top and bottom face sheets 14, 114', respectively, the pressure of the slurry head causes the core slurry 44' to more readily bond with both the dense slurries 38, 138 and also causes the dense slurries 38, 138 to further penetrate through the mats of the bottom and top face sheets 14, 114', thereby more thoroughly coating the outer surfaces of the finished gypsum board 94, 96.

To facilitate the constriction of the slurry head 44', the second forming plate section 86, extending from the hinge 88 toward the surface 72 of forming table 70, produces a very acute angle and one section 86 is almost parallel to the surface 72 of the table 70. The acute angle and the smooth surface of the plate sections 84, 86 produces an even smooth surface defining the top surface 94 of the gypsum board, with the overwhelming majority of the mineral fibers of the mat of top facing sheet 114' covered by the dense slurry 138, and similarly the face surface 96 also essentially covered by the dense gypsum slurry 38.

Figure 7:
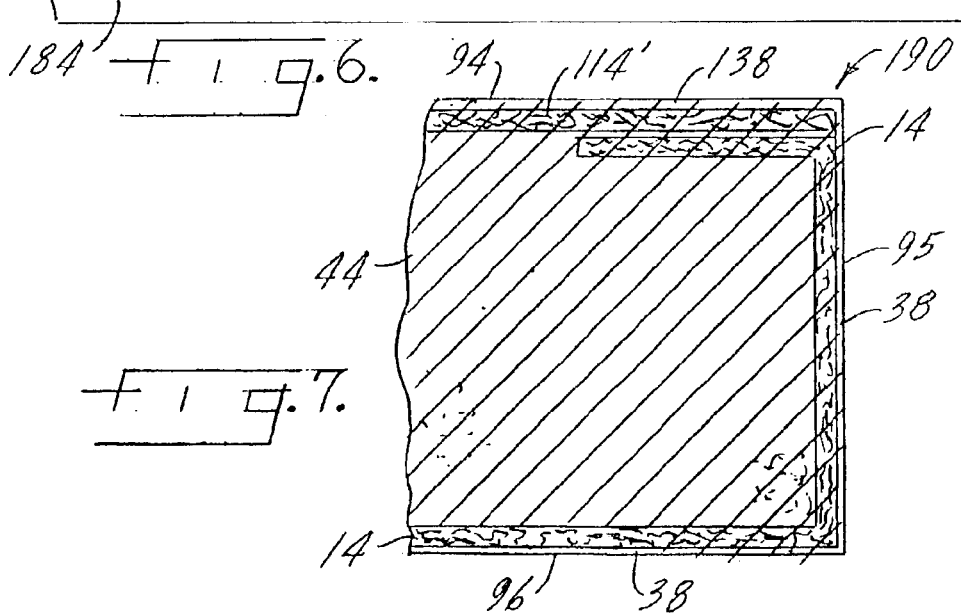
FIG. 7 is a detailed, cross-sectional, diagrammatical view of a gypsum board according to the present invention manufactured utilizing the inventive gypsum board production process and the forming station shown in FIG. 1.

The final forming step in the board production is the edge formation of the two lateral edges of the board. The width of the bottom face sheet 14 upon which the core slurry has been evenly spread out is slightly larger, by about 2.5–5.0 mm. (one to two inches), than the width of the top face sheet 114. As the bottom face sheet 14 passes through the creaser wheel assembly 20, the creaser wheels 22, 22' crease the edges so that the width between the creases is the predetermined, desired width W (FIG. 4) of the final gypsum boards. The extra width of mat 14 extending beyond the creases for a distance about 2.5 mm (one inch) at either edge, is preferably turned up, and thus provides a border for containing the core slurry 44 which is extruded onto the top face sheet 14 between the creases. As the top face sheet 14 passes through the face sheet joining station 80, and at the lap point in the production line where the two ace sheets 14, 114' are at or close to the desired separation essentially defining the thickness of the gypsum board, a mechanism at the sheet joining station (not shown) completes the inward folding of the creased portions and simultaneously deposits facing sheet 114' over the folded edges to produce a formed board edge 95 (FIG. 7).

The creased edges of the bottom facing sheet 14 are thus turned over and the top facing sheet 114' is set into the inward folds of the bottom facing sheet 14, thus completing the covering of the longitudinal edges of the gypsum board. Completely penetrated dense gypsum slurry at the lap point of sheets 14, 114' thus sets up and seals he edges 95 of the gypsum board product 190 (FIG. 7).

The gypsum board at this stage of production passes from the gypsum board forming station 10 toward the remainder of the finishing process that takes place on the belt line 180. To facilitate the passage of the gypsum board from the forming station 10 to the belt line 180, the forming table 70 includes a forming table extension plate 78 supported by the forming table 70, and extending from the edge of table 70 toward the surface of the belt line 180. It is important for maintaining the smoothness of the gypsum board surface 96 that the amount of vertically unsupported gypsum board is minimized when the gypsum is still in a wet state, effectively remaining as a slurry before setting. At the distal end of the board forming station 10, forming table 70 is adjacent the belt line 180 and the board passes from table 70 to belt line 180. Belt line 180 comprises at least one set of roller wheels, one roller wheel 182 which is shown in FIG. 1, with an endless belt 184 looped about the roller wheels 182 provide a means for motive power to transfer the sheets 114 and 114' and for removing the still wet gypsum board away from the board forming station 10.

The production of the gypsum board at the board forming station 10 is capable, as a result of the modifications described above to efficiently produce gypsum board at the rate of about 45 meters (150 feet) per minute or even higher rates. Accordingly, the rate of the moving belt 184 must match the speed of production, and the two rates are ideally coordinated so that increasing the production speed also increases the speed of the belt 184. As shown in FIG. 1, the edge of the forming table extension plate 78 is as close as possible to the beginning of the belt 184 so that the gypsum board passes from the forming table 70 to the belt line 180 subassembly without interference, all the time having vertical support of the gypsum board from the extension plate 78 and belt 184. To facilitate the transfer, the table deck 59 has a top-working surface that is essentially coplanar to the surface of belt 184.

Figure 4:
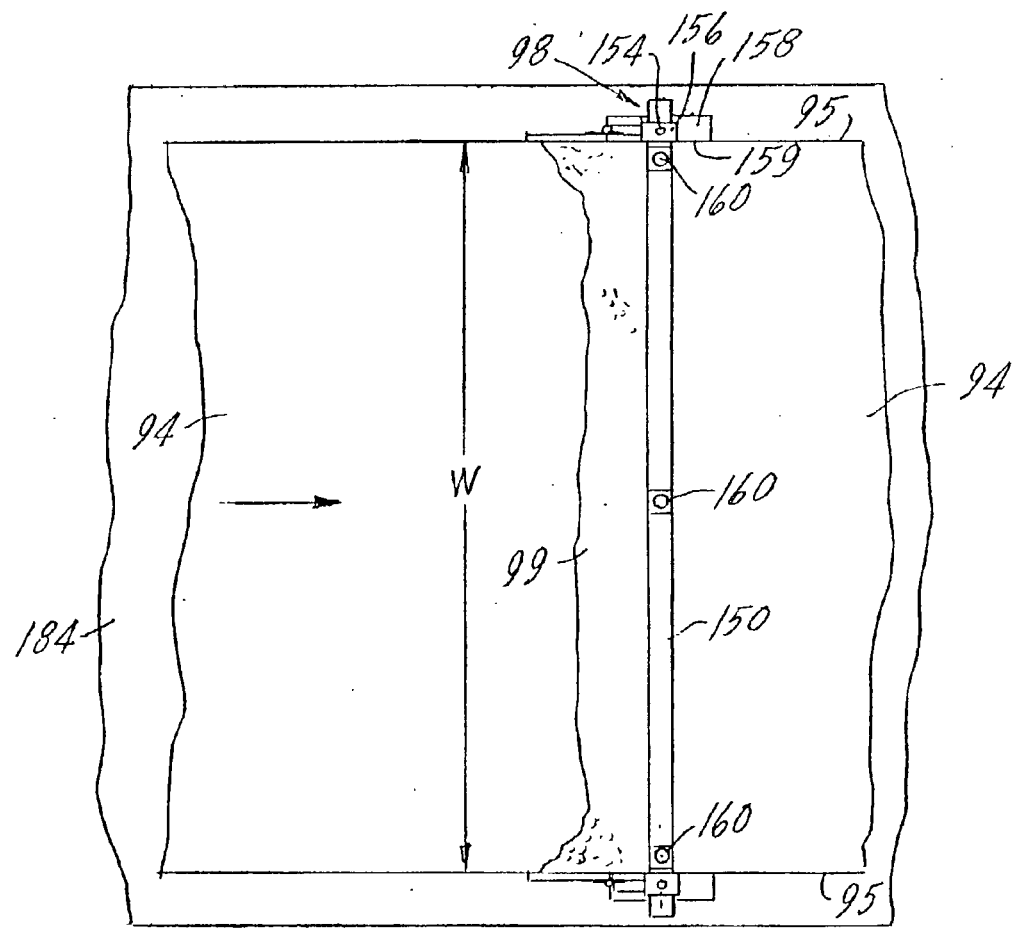
FIG. 4 illustrates the edger flapper bar feature according to the present invention.
Figure 5:
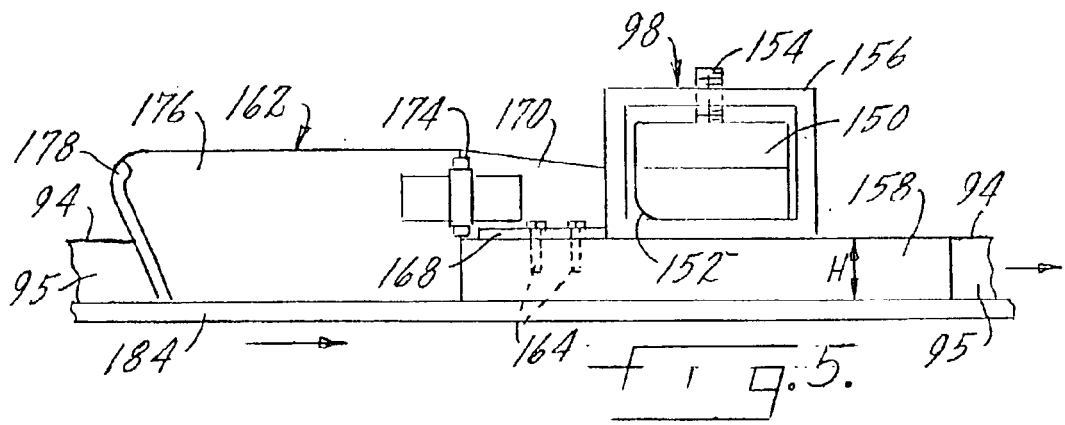
FIG. 5 is a side view in detail of the edger flapper bar shown in FIG. 4.
Figure 6:
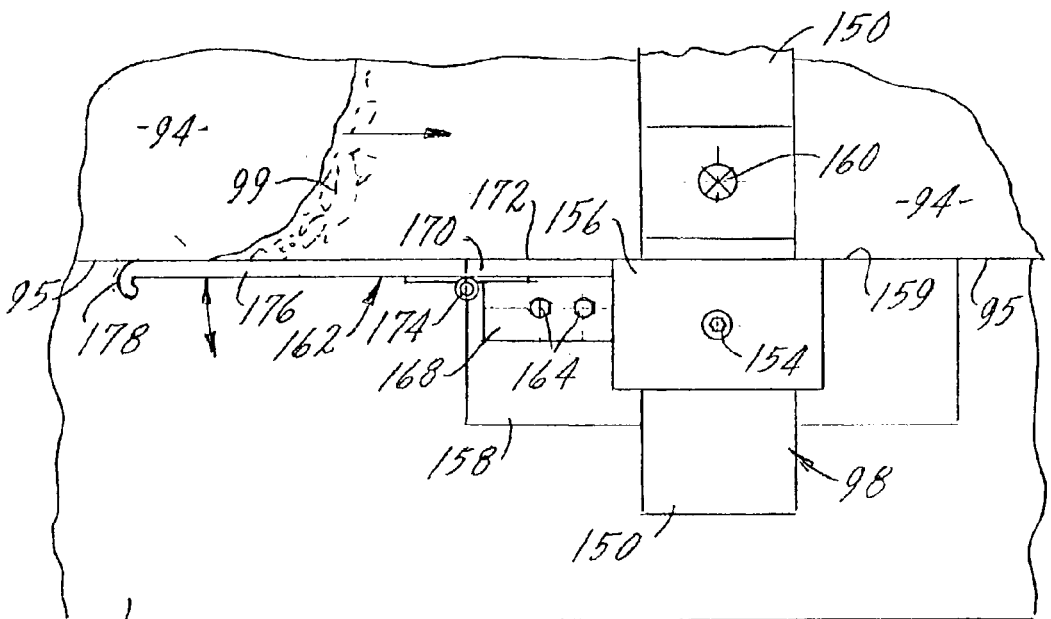
FIG. 6 is a detailed top view of the edger flapper bar feature shown in FIG. 4.

To further improve the appearance and smoothness of the gypsum board back face 94, a first edger bar assembly 98 is disposed adjacent the gypsum board back face 94 and above the belt 184, at a point disposed further along the length of the board production line, as shown in FIG. 1. FIGS. 4, 5 and 6 illustrate in greater detail the first edger bar assembly 98, which provides an optional additional manufacturing operation for providing surface smoothing of the dense slurry layer 138.

The edger bar assembly 98 (FIGS. 4, 5 and 6) rides above the belt line 184 immediately adjacent the face 94. The edger bar assembly 98 is mounted in place to stabilize its horizontal position by an appropriate mounting mechanism such as a stabilizer mount. The assembly 98 comprises an edger bar 150 having a rounded front bottom edge 152, which is the leading edge that comes into contact with the gypsum board 94 passing below the edger bar 150. Edger bar 150 continually contacts the wet gypsum slurry face 94 to provide a trowel effect over the gypsum board surface so as to skim over any remaining uncovered areas to fill them in. The edger bar 150 may also create a small slurry dam 99, across the field of back face 94, as shown in FIG. 4, the size of which may be adjustable by adjusting the vertical separation between the bottom edge of the edger bar 150 and the surface of belt 184.

The vertical position of edger bar 150 is adjustable by means of mounting screws 154 which themselves are attached to two laterally disposed tubular clamping elements 156 for retaining the edger bar 150. As shown in FIG. 4, the length of edger bar 150 is longer than the width of the gypsum board surface 94, and the inboard edges of the clamping elements 156 are separated by a lateral dimension equal to the width W of the board. Optional pneumatic vibrators 160 are mounted within the edger bar 150 to assist in the gypsum slurry smoothing operation and to inhibit slurry buildup on the edger bar 150.

As described above, gypsum board and belt 184 are continually transported by the belt line 180 in the direction of the arrow, as shown. The edger bar clamping elements 156 are themselves mounted upon two laterally disposed hedger shoes 158 that ride directly upon the upper most surface of the belt 184. The height of the hedger shoes 158 above the belt 184 approximates the thickness of the gypsum board. The longitudinal edge 95 of the gypsum board is in continual contact with the board surfaces 159 of the hedger shoes 158, the contact completing the forming of the surface at the longitudinal edge 95. As shown in FIG. 4, the edger bar 150 maintains a slurry head 99 that spreads out over the board surface 94, and which completes the forming of a smooth surface 94 in which exposure of glass fibers is minimized by the gypsum slurry coating.

An edge flapper mechanism 162 is also mounted onto the top of each hedger shoe 158 by an appropriate attachment means, such as bolts 164. Bolts 164 attach one leg 168 of a stationary L-shaped mounting bracket (not shown in FIG. 1) to the top surface of the hedger shoe 158, as shown. The other leg 170 of a mounting bracket may extend vertically from the horizontally extending leg 168 such that an inward facing surface 172 is coplanar with the inwardly facing surface 159 of hedger shoe 158. The vertical extension of leg 170 is high enough above the board surface 94, so that the slurry head 99 forming thereon does not spill over the top of the edge flapper mechanism 162.

The vertically extending leg 170 includes a vertical spring hinge 174, that attaches a edge flapper 176 to the vertically extending leg 170, such that the edge flapper 176 is capable of rotating to a limited extent about the hinge 174, as shown by the double arrows in FIG. 5. The spring hinge 174 forces the edge flapper 176 to abut the longitudinal edge 95 of the gypsum board, the force of the spring hinge 174 being sufficient to retain contact between the edge flapper 176 and the board longitudinal edge 95 to counter the horizontally directed pressure of the slurry head 99. The edge flapper 176 has a rounded leading corner 178, which assists in the gathering of any slurry overflow so as to retain the gypsum slurry on the board surface 94.

During board manufacture, the edger bar 150 is displaced horizontally a very short distance from the rotating wheel 182 so as to absorb the sudden impact of any excess upwardly directed pressure on the edger bar 150, such as may arise from an anomaly in the board or during start up or shut down procedures. The belt line 180 provides some flexibility so that a sudden, slight upward or vertical pressure may be accommodated without disturbing the surface coating 94 of the gypsum board.

The edger bar 150 also produces an improved, smoother and denser gypsum layer on surface 94 than that which is produced by the first penetrated slurry coat 138 applied by the top roll coater sub-assembly 110. This denser coat arises from the tendency of the second slurry head 99 to continue the process of extruding entrained air bubbles from the wet slurry mixture.

A second, and preferred, embodiment of the edger bar assembly 298 is illustrated in FIGS. 8–11. In many respects, the edger bar assembly 298 is similar to edger bar assembly 98. Assembly 298 also rides above the belt line 184 immediately adjacent the board face 94. The edger bar assembly 298 is mounted in place to stabilize its horizontal position by an appropriate mounting mechanism, such as stabilizer mounting device 297, as shown. The mounting device 297 comprises a mounting base 302, firmly attached to a stable position, for example the ground or the underlying structure of the conveyor system 180. The stabilizer mounting device 297 may further include a lift piston 306 within the mounting base 304 for driving the mounting arm 302 in a vertical direction. Mounting arm 302 engages the edger bar mounting extensions 252 and can be electronically or otherwise controlled to change the vertical position of the edger bar, as will be explained below.

Similar to edger bar assembly 98, edger bar assembly 298 also includes an edger bar seat 302, upon which the remaining elements of edger bar assembly ride. Bar seat 302 includes an aperture 308, and two or more vertical secondary apertures 309 for providing orientation and stabilization for the edger bar.

Edger bar assembly 298 includes a modified edger bar 250 having edger bar mounting extensions 252 extending laterally from the edger bar 250 and in to the apertures 308, one at each lateral edge of the assembly 298. As best seen in FIG. 9, the edger bar extensions 252 extend beyond the lateral edge of the conveyor belt 184, where they engage the stabilizer portions of the edger bar assembly 298. The vertical position of the edger bar assembly 298, and of the edger bar 250, and the separation between the edger bar 250 and the top surface of the conveyor belt 184 is controlled to maintain a desirable thickness of the gypsum plaster board 190.

The bottom skimming surface 254 of edger bar 250 continually contacts the wet gypsum slurry face 94 to provide a trowel effect over the gypsum board surface so as to skim over any remaining uncovered areas and thereby fill them in. The edger bar 250 may also create a small slurry dam 199 across the field of back face 94, as shown in FIG. 9, the size of which, by means of the stabilizer mounting device 297, may be adjustable by adjusting the vertical separation between the bottom surface of the edger bar 250 and the surface of belt 184.

To assist in maintaining a slurry dam 199 capable of providing a skimming effect to produce a smooth board surface 94, a forward angle, pre-forming plate 310 defines as a leading edge of the edger bar 250. The forward angle, pre-forming plate 310 provides the function of blocking and directing excess gypsum slurry to the head 199, thereby creating a ready source of the gypsum slurry, as shown in FIG. 9, which head 199 provides the gypsum slurry for filling any remaining voids on the surface, and for smoothing out the surface 94 of GRG board.

Forward angle, pre-forming plate 310 defines an acute angle relative to the surface 94 which is capable of gathering the gypsum slurry that is skimmed off the gypsum board surface 94 and redirecting it to be reformed on to the desirable smooth surface. A preferred value for this angle is between about 30°–60°, with a most preferred value being about 45°. The forward angle, pre-forming plate 310 may have a backing plate 312, also having two sections defining a similar acute angle. Backing plate provides a supporting structure for the forward angle, pre-forming plate 310.

The pre-forming forward angle plate 310 of the edger bar 250 is preferably integrally formed with the edger bar itself, or alternatively, may be attached thereon by appropriate means (not shown). It is important, however, that the transition from the bottom surface of the pre-forming forward angle plate 310 to the forming surface 254 of the edger bar 250 should be smooth and without impediments to the even coating of the gypsum slurry over the surface 94. Although shown in phantom in FIG. 8 as a sharp angled juncture, a round smoother transition between the pre-forming plate 310 and surface 254 may be preferable. The longitudinal width of the edger bar 250 has a length in contact with surface 94 that is longer, in the direction of travel of the gypsum board having a length of about 20 cm (8 inches). This longer length results in a longer smoothing contact of the edger bar 250 with the surface 94.

To provide a smoother, non-stick surface 254, it may further comprise a Teflon® coating on the underside of the second forming plate defined by the under surface of edger bar 250. Alternatively, the entire edger bar 250 may comprise a non-stick material such as Teflon®.

To provide increased capability of smoothing and completion of the desired geometrical configuration during formation of the gypsum board lateral edges 95, an edge flapper subassembly 262 is amounted to operate together with edger bar 250, as is described below.

Optional pneumatic vibrators 260 are preferably mounted within the edger bar assembly 298, preferably on the pre-forming forward angle plate 310; to assist in the gypsum slurry smoothing operation and on the flapper edger sub assembly 262 to inhibit slurry buildup on the edger bar 250.

As described above, gypsum board and belt 184 are continually transported by the belt line 180 in the direction of the arrow, as shown in FIG. 9. However, a significant difference in this embodiment (FIGS. 8–11) is that the edger bar assembly 298 does not ride on the surface of the belt 184, but has a height relative to that surface that is independently controlled by the mounting device 297, as described above. As shown in FIG. 9, the edger bar 250 maintains a slurry head 199 that spreads out over the board surface 94, and which completes the forming of a smooth surface 94 in which exposure of individual glass fibers is minimized by the gypsum slurry layer.

Edger bar assembly 298 further includes an edger flapper mechanism that is mounted onto the edger bar 250 by an appropriate attachment means, may engage both the edger bar extensions 252 and through appropriate apertures 309, which may be threaded, in the mounting arm 302. The attachment of the edger bar assembly 298 to the mounting stabilizer device 297 through mounting base 304 provides for a unitary edging mechanism that creates a smooth surface 94 and simultaneously provides a smooth gypsum layer on the edges 95 of the gypsum board.

Another difference with the edger bar assembly 98 is the omission of edge shoes. Instead, the edger bar assembly 298 includes disposing the Teflon® flaps 320 at opposite ends of the edger bar 250, comprising a dimension in the range of from about 15 cm (6 inches) to about 180 cm (72 inches). The Teflon® flaps 320 are disposed abutting the edge 95 of the gypsum board so as to form it in a squared or other geometrical figured edge. A Teflon® material is preferred to provide a smooth surface that will not interfere with the continuous passage of the gypsum board in the direction of the arrow as shown in FIG. 9.

To further inhibit the excess formation of gypsum slurry on the surface of board edge 95, an edge flapper mechanism 262 is disposed to work in conjunction with the Teflon® flaps and the edger bar 250. The edge flapper mechanism 262 (FIGS. 10 and 11) also provides a means for retaining the slurry head 199 from over flowing over the gypsum board edges 95 during production, and inhibits formation of gypsum slurry patches on the moving belt 184.

Figure 10:
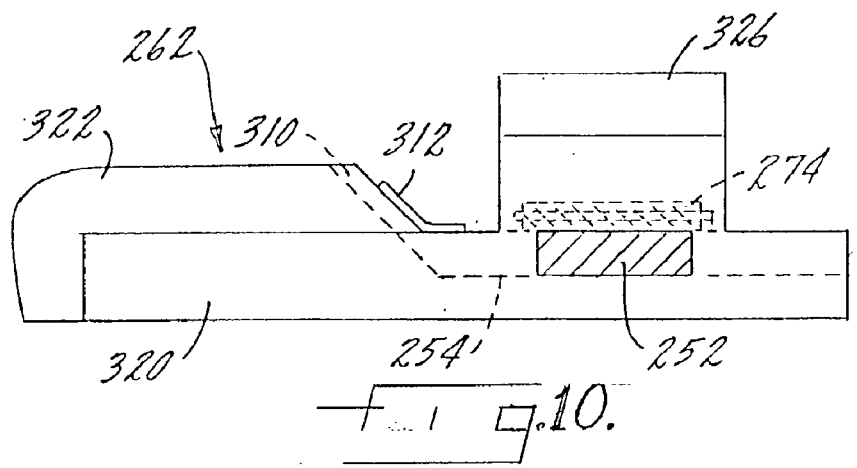
FIG. 10 is a detailed side view of the edger flapper bar feature shown in FIG. 4.
Figure 11:
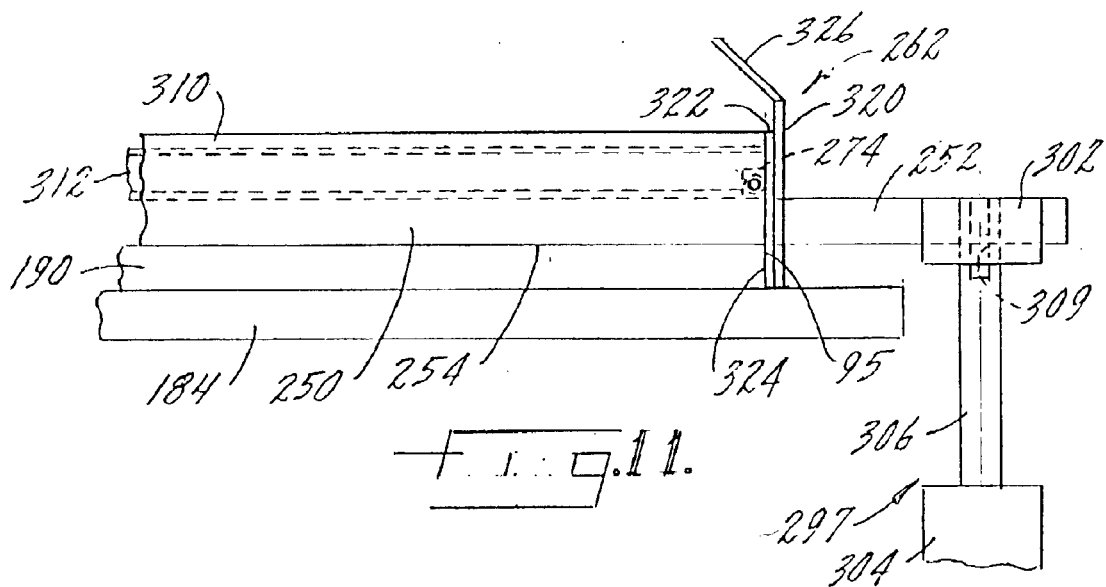
FIG. 11 is a detailed, cross-sectional, diagrammatical view of a gypsum board traveling through the edger bar assembly according to the present invention as shown in FIGS. 8–10.

The edge flapper mechanism 262 is disposed on the edger bar 250, and attached thereto by an appropriate means for example, as described above relative to the edger bar assembly 98 (FIGS. 4–6). Referring now to FIGS. 10 and 11, one flapper 322 is disposed over the flaps 320, and can pivot relative thereto as a result of a pivotal spring hinge 274, which attaches the flapper 322 to the edger bar 250. As in the edge flapper 162, the spring hinge 274 provides a tensional force to abut the edge flapper 322 against surface 95 rotationally about the spring hinge 274, the spring hinge 274 providing sufficient force to retain contact between an inner surface 324 of the edge flapper 322 and the gypsum board longitudinal edge 95. The force of spring hinge 274 counters the horizontally directed pressure of the slurry head 199. The edge flapper 320 may include a compression activated lifting lever 326, which assists in forcing the flappers 322 to rotate upwardly when the assembly 298 is raised away from surface 94. The specific arrangement of the edger bar assembly 298 disposes the edge flapper mechanism 262 directly against the longitudinal edge 95 of the gypsum board. However, the configuration differs from that of edger bar assembly 98 in that the edger bar extension 252 extends away from the edge flapper mechanism 262 so as to remove and somewhat isolate the extension and elevational controls 297 from the edge flapper mechanism 262. This configuration does not impact greatly on the operational efficiency of the edge flapper 322 or the edger bar 250, which provides similar functions to that of the edger bar assembly 98 in a similar way, but the configuration tends to maintain the pneumatic devices free and clear of gypsum slurry so as to avoid problems with the operations thereof.

Figure 12:
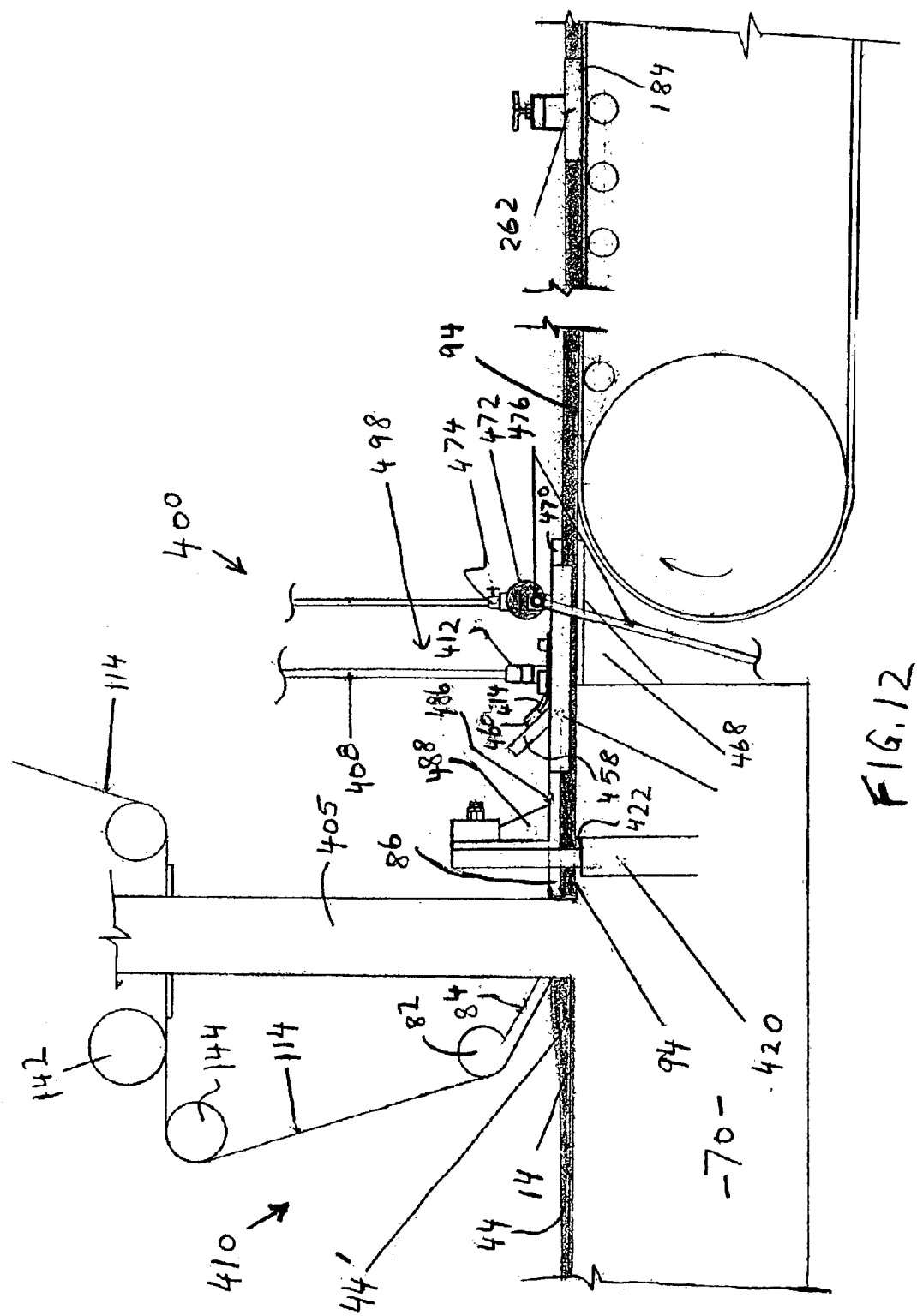
FIG. 12 illustrates a schematic, diagrammatic elevational view of the gypsum board final forming apparatus according to the present invention.
Figure 13:
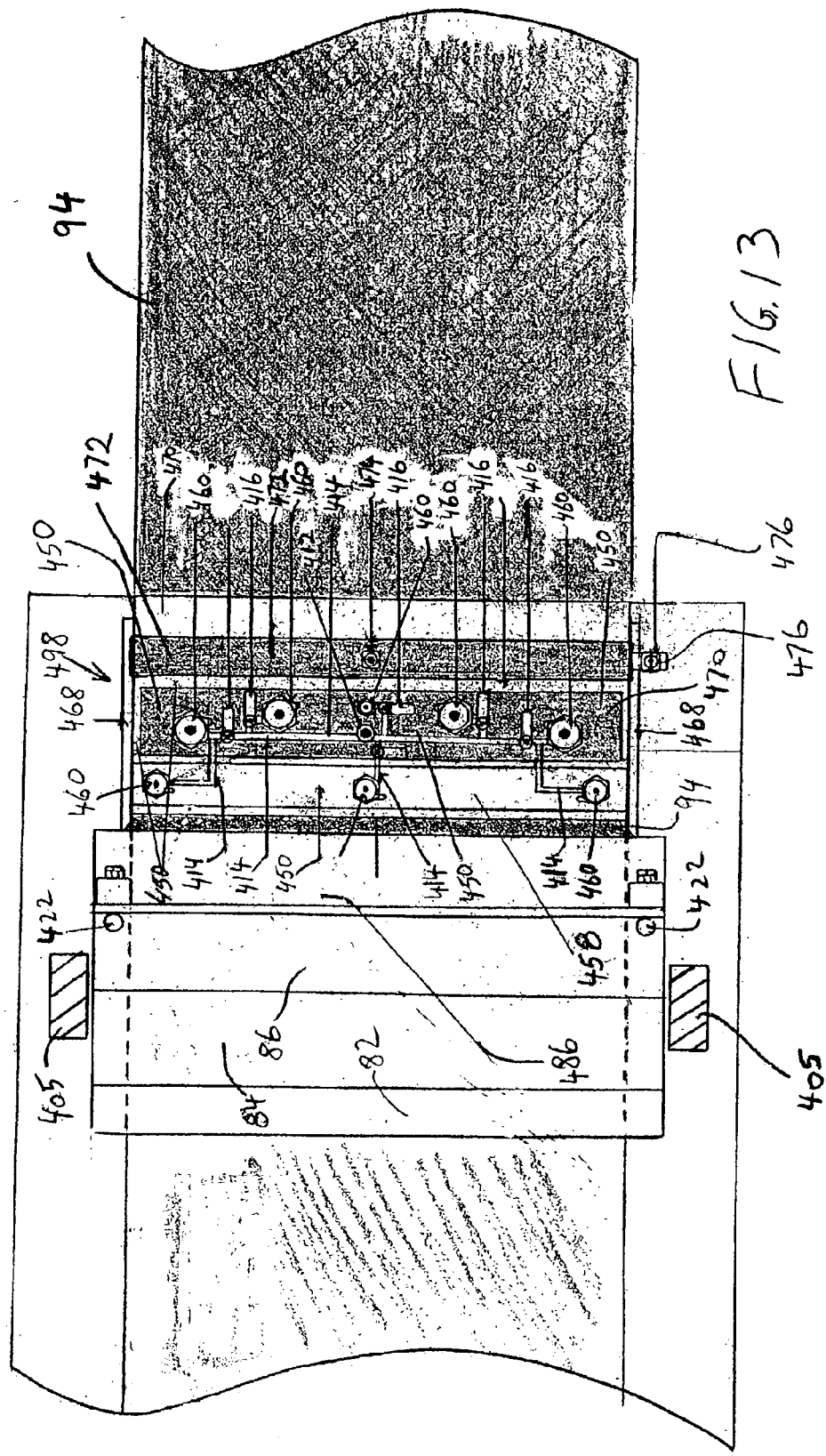
FIG. 13 illustrates a top diagrammatical view of the gypsum board production and transportation line including the gypsum board final forming apparatus shown in FIG. 12.

Referring now to FIGS. 12–14, yet another embodiment of the edger bar mechanism is illustrated, shown disposed downstream of the gypsum board manufacturing station. The equipment and process for the manufacture of the gypsum board itself, prior to the final edge finishing steps, is generally identical to that of the previous embodiments, and will not be described in great detail herein. Thus, identical or like elements will be designated with the same reference numerals and different reference numerals will designate those unique portions of this embodiment.

FIG. 12 illustrates a diagrammatic or schematic elevational view and FIG. 13 illustrates a top diagrammatical view of the gypsum board production and transportation line, designated generally as 400. The gypsum board production includes a bottom facing sheet 14 and a top facing sheet 114, with the slurry 44 being disposed between the two sheets of randomly aligned inorganic fiber material. The apparatus includes pin 82 and forming plate sections 84, 86, for producing a gypsum board 94 having a desired thickness. A post 405 is shown for mounting the top sheet delivery system 410, including a mount for the mat roll 112 (FIG. 1). The forming table 70 provides the working surface for gypsum board manufacture.

As shown in FIGS. 12 and 13, additional extensions 486 of the forming plate 86 are shown, supported by a forming plate support 488. The forming plates 86, 486 and support 488 comprise a leading edge portion of a back skim coater assembly 498, connected together and being transposable in a vertical direction, and the transposition of assembly 498 being controlled by a forming plate lifting system 420 transpose the assembly vertically along post 405. Lifting system 420 preferably includes an actuator 422, either electromechanical or hydraulic, for adjusting the height of the forming plate support 488, and forming plates 86, 486, from the surface 72 of the forming table 70, to obtain the desired gypsum board thickness. The lifting system 420 may also lift the forming plate assembly 498 to a remote location spaced from the board 94, during times when the production line is down, so as to provide easy access to the equipment for adjustment, repair or cleaning.

As in previously described embodiments, the back skim coater assembly 498, sometimes referred to herein as the forming plate assembly shown in greater detail in FIG. 14, includes a slurry inlet lip 458 for guiding and redirecting any excess slurry buildup 459, which may include rehydrated water that is exuded by the gypsum as it sets up in the exothermic gypsum reaction for forming the set gypsum, as described above. Forming plates or a gypsum contacting vibrating contact member, also referred to herein as a contact forming plate 450, provides the smoothing function to provide as smooth a surface as is desirable on the gypsum board surface.

The back skim coater assembly 498 is maintained in a stationary or fixed raised position by the forming plate lifting system 420. During operation, the assembly 498 is lowered to a suitable height so that the forming plate contact surface continually contacts the moving dense gypsum surface layer 114 of the board 94. The height is suitable to form the board 94 to a desired thickness, and the weight or pressure exerted by the contact forming plate 450 is sufficient for formation of the board surfaces 14 and 114, and should also be sufficient to exert enough applied pressure so as to produce a volumetric unset gypsum slurry head 459, as shown in FIG. 14.

It is advantageous and preferable that the water film is provided over the surface of the gypsum board at the point in the gypsum board formation process known in the gypsum board industry as the initial set or stiffening point. At this point, there is a measure of control that can be provided over the board setting process by introducing formulation additives to increase or decrease the speed of recrystallization of the gypsum form solution or slurry form.

Pressure is continuously exerted on the gypsum board surface, moving in the direction of the arrow A, and is applied at the internal low side 456 of the slurry guide inlet lip 458. As the forming plate assembly 498 is deposited upon the top surface of the board 94 so as to support the weight thereof, the assembly 498 should be free to self adjust in the vertical direction, and the weight thereof should be equally distributed across the width of the board 94 so that the contact forming plate 450 provides a uniformly even surface pressure on the gypsum board 94, thereby producing a board of uniformly even thickness. The angle of incidence of the contact forming plate 450 relative to t the surface of the moving board may be variable or fixed, as desired, in a range of from about 25' to about 90°.

Alternative methods of providing the smoothing section may be provided. For example, the inlet slurry lip may be modified into any of a number of different shapes, such as convex or bullet nose shapes, which produce a scooping and flattening effect on the surface of the board. Another modification to the slurry inlet lip may be to provide a concave depression (not shown) so that the slurry can be collected in a transversely central portion of the back skim coater assembly and be added to the center of the moving board, or have a convex surface to direct the excess slurry toward the edges, as desired. Orientation of the inlet slurry lip relative to the board moving direction may also be altered, for example, by a diagonal orientation.

Alternatively, rather than a slurry inlet lip 458, one or a set of roll coater wheels (not shown) may be used for the back skim coater to initially evenly smooth the surface before the board is further finished by the fluid bed, as is further described below. The roll coater(s) may be mechanically or electromechanically driven in either a forward or backward rotation, and may be fixed or adjustable to provide a final surface and thickness dimension to the board.

The back skim coater assembly 498 further includes a transversely extending vibrating contact member 450, which may comprise a smooth metal or composite material capable of producing a smooth gypsum surface. To provide a catalyst for production of a smoother surface, the various members of the back skim coater assembly 498, for example, the slurry inlet lip 458 and the contact member 450, each have one or more associated pneumatic vibrators 460. The vibrators 460 are typically arranged across the width of the back skim coater assembly 498, as shown.

The vibrators 460 are preferably driven by a pneumatic or air driven means, the pressurized air being supplied from an outside source, such as a pump (not shown), through an air supply line 408 to an air supply manifold coupling 412, that in turn feeds each of the vibrators 460 through feed lines 414. The rate of vibration of each vibrator 460 is controlled by a vibrator air flow control valve 416 disposed in line in the feed path between each vibrator 460 and the manifold coupling 412.

The vibrators 460 are generally activated as the main contact forming plate 450 reaches its working height, and the vibration oscillation speed of the vibrators 460 is controlled by the adjustment of valves 416 to a rate suitable to prevent excessive build up in the slurry head 459 and also eliminate large air pockets that may have remained in the dense gypsum surface layers 14, 114 of the gypsum board 94. Additional vibrational pressure is also provided for the as yet unset gypsum to penetrate into the interstices between the fibers and completely cover the outer surfaces of the board 94 with the dense gypsum.

The slurry inlet lip 458, the contact forming plate 450, the forming plate 86, and the forming plate extension 486 may comprise any of a number of hard or hardened durable materials, for example, metal, ceramic, composite materials, or durable plastic. The slurry inlet lip 458 and the contact forming plate 450 preferably each include a gypsum contacting surface that is polished or has chrome coating, if metallic, ceramic or composite materials are used, so as to inhibit adhesion of the slurry buildup to the forming surfaces of the plates, which can quickly build up because the adhesion of slurry on the surfaces may provide a surface for additional buildup. Thus, a slick or very smooth contact surface is desirable for each of the gypsum forming members so as to permit all of the unset gypsum to be processed in the gypsum board without setting up on the contact surfaces. Alternatively, the slurry inlet lip 458 and the contact forming plate may have contact surfaces coated with a non-stick coating, for example, a TEFLON® (polytetrafluorethylene, tetrafluoroethylene fluorocarbon, fluorinated ethylene Propylene). VINYL® (polyethylene) or NYLON® (polyamide, poly (hexamethylene adipamide) surface coating (not shown), to prevent surface adhesion of the unset gypsum slurry. The contact surfaces of the contact forming plate 450 may be smooth or contoured, or have an edge design, in the machine line-parallel or transverse directions, to provide desirable gypsum surface or edge effects, as otherwise described with reference to other embodiments herein.

As with the other embodiments described above, the contact forming plate 450 and other elements of the contact forming plate assembly 498, are supported by mounting elements, including the forming plate support 488, that provide the structural framework for the lifting system 420 to position and orient the back skim coater assembly 498 relative to the quickly moving gypsum board 94 so as to provide the desirable surface treatment to the gypsum board 94.

In addition, each lateral edge of the gypsum board is also shaped by two end shoes 468, shown in FIG. 12, for forming and smoothing the edges of the board 94, that also are preferably mounted on the contact forming plate assembly 498. The end shoes 468 are not shown or described here in great detail, but may provide the functions as discussed with reference to other embodiments, such as providing a sharp edge, or for turning over the dense slurry layer to provide a glass mat protected edge as described with regard to the lateral edge walls 95 of the gypsum board embodiment illustrated in FIG. 7. The end shoes 468 further contain the unset slurry within the confines of the back skin coater assembly 498 and on the top surface of the gypsum board 94, thereby avoiding leakage of gypsum slurry over the forming belt 184. The end shoes, 468, also referenced to as end flappers with respect of other embodiments above, may also include one or more vibrators (not shown) so as to inhibit gypsum slurry build up on the contact surfaces.

Further smoothing of the top surface layer 114 of the dense slurry to achieve a very smooth front surface of the gypsum board 94 may be provided by a microporous fluid bed contact plate member 470 for providing pressurized water so as to produce a continuous film of water over the top surface of the gypsum board 94. Now referring to FIGS. 12–15, the microporous fluid bed provides a fluid film, as will be explained below, by using a pressurized water manifold 472 having a fluid bed manifold control valve 474 for controlling the amount and pressure of fluid flowing into fluid bed micropore structure, which is shown in greater detail in FIG. 15. The pressurized fluid from the manifold is dispersed to the microporous fluid bed 470 through manifold piping, described in greater detail below. A manifold discharge 476 with a valve 478 may be utilized to depressurize or to drain the fluid from the manifold 472.

As is shown in FIG. 15 illustrating detailed cutaway elevational views of the manifold 472 and microporous fluid bed structure 470. The fluid bed manifold 472 includes a plurality of supply pipes 440 that distribute pressurized fluid from the inlet source and the pressurized fluid manifold 472 to a plurality of fluid bed micropore outlet branch members 442, which further comprise a plurality of micropores 444, (shown in phantom) that distribute the pressurized fluid through apertures 446 onto the surface of the gypsum board 94. The surface 94 continues to be in contact, with a fluid bed contact forming plate member 470, that continues the smoothing and shaping process, or alternatively, is an extension (not shown) of the contact forming plate 450. The fluid bed contact surface 445 provides the smoothing function of the plate 470, and the surface may also comprise a polished or chrome coating or other non-stick material. Ideally, the transverse dimension of the skim coating surface of the forming plate member 470 is wide enough to accommodate boards of any size, but can be adjustable to produce board-shaving a width between 6 inches (15.24 cm) and about 54 inches (137.2 cm).

The surface 445 may comprise a smooth place or contoured surface having a plurality of the micropore apertures 446 through which the pressurized fluid is dispensed over the surface of the gypsum board 94. The micropore apertures 446 are preferably evenly spaced from each other and extend across the width of the micropore contact forming plate 470 to evenly distribute a film of fluid over the surface.

It is an embodiment of this invention that the moving water film, in conjunction with the contact pressure exerted from the contact surface of the skim coater assembly acts as a trowel mechanism that levels and smooths the gypsum board surface resulting in a finished gypsum board 94 that has a well finished, almost glossy appearance. A finish of this level of smoothness is typically applied by hand using manual labor to apply a skim coating gypsum compound to a paper faced gypsum board after said paper faced gypsum board has been installed to a wall assembly, and is referred to in the industry as a level 5 finish, a highly desirable feature surface that offers a non-blemished smooth wall appearance for normal priming and painting. In this invention, and for use on said enhanced glass reinforced gypsum board manufacturing, as the gypsum surface is modified with an entrained polymer compound, because the surface is of level 5 finish smoothness, there is no need for the priming step prior to painting as the entrained polymer also acts to serve the intended purpose of the standard priming step during a paint finishing procedure. For example, such a surface may be painted directly thereon, without need of a primer or other pre-finishing step.

The micropores 444 are essentially in the shape of cones (shown in phantom) having their apex at the surface 445, and ending with the apertures 446, so as to continually bleed a stream of fluid into the space between forming surface 445 and the top surface of the gypsum board 94. Strategic placement of the apertures 446 relative to the transverse extension of the contact surface 445 of the fluid bed micropore member 470 will provide a film of fluid that extends across the complete width of the board 94 between the edges 95.

The fluid film is provided over the surface of the gypsum board at precisely the point in the gypsum formation process known in the gypsum board industry as the initial set or stiffening point. The fluid moves transversely across the dense gypsum layer on the top surface of the gypsum board 94 at the point where the gypsum is initially setting up and forming the surface of the dense gypsum layer, just as the rehydration reaction is commencing. At this stage, gypsum begins to lose its fluid character and begins to be workable, as in other industrial cementitious compounds. The gypsum is not yet at a final setting stage where rehydration is complete, but is still plastic enough to control formation and to begin the form of a final surface layer.

As the gypsum board continues to be transposed along the gypsum formation line, the rehydration reaction proceeds and as it is an exothermic reaction, it gives off heat and also water as a by-product. This water, together with the film of fluid provided by the microporos fluid bed 470, adds to the plastic nature of the dense gypsum layer on the board surface. The gypsum continues to stiffen as it is rehydrated, and the smooth contact surface 445 subjects toe top surface of the gypsum board 94 to a further smoothing action over the top most dense slurry gypsum layer. The smoothing action occurs not only due to the contact of the surface 445, but also because the fluid film at the interface between gypsum board surface 114 and contact surface 445 provides a re-sexualizing capability to the gypsum at the interface. This process aids in providing an additional level of finishing to a smooth, level five (5) appearance. It also aids in further providing a more dense layer of gypsum at the surface, since as the fluid evaporates, it leaves behind the gypsum in a set up state with the fluid removed.

The surface 445 of the microporous is capable of producing a smooth or contoured troweled contact surface, in both the gypsum line direction and the transverse direction. This surface action completes the formation step of the gypsum layer The remaining process steps for completing processing of the gypsum board are considered essentially standard and are not described in detail herein. The belt line 180 removes the production gypsum board from the board production station 110, at the rate of 45 meters (150 feet) per minute, or even higher. The amount of time that is necessary for gypsum to set in a hydration process is known, and because the board must be supported by a horizontally extending surface during initial hydration, it cannot be removed from the belt line 180 or from some other horizontal supporting mechanism. Production rates of gypsum board produced by prior art processes were significantly slower than that produced by the present inventive production process. Consequently, the speed of the belt line was much slower.

To accommodate the significantly faster production rate of the present inventive process, the belt line 180 must be significantly longer than for the prior art production line, perhaps extending for over 180 meters (600 feet) or more. The actual rate of hydration is dependent on ambient conditions, such as temperature, humidity, gypsum consistency, etc. If necessary, the rate of production and speed of the belt line 180 may be modified to take into account those conditions to achieve complete hydration prior to the subsequent production steps.

Following the hydration step, the gypsum board is cut to desired lengths to produce gypsum board segments which are then turned over by turner arms and replaced onto transfer belts. Spray coating or painting of the top surface of the boards, after they are turned over, is appropriate at this stage. The boards are then transferred by a roller table (not shown) into a dryer, which process essentially may be performed by standard or known board drying procedures. The hydration process results in separating the fluid, which is in solution with the gypsum in the set slurry state, and further hardens to completely set the gypsum in the final gypsum board product, and the drying process removes the resulting fluid.

The drying process removes the fluid from the hydrated wet gypsum by means of passing the gypsum board segments through one or more dryer sections that vary the temperature through a number of different settings. It has been found that use of mineral fibers, such as glass fibers, for the backing mat in the front and back faces permits lower temperatures to be used, and the lower temperatures, together with the absence of standard paper backing in the gypsum board, reduces the amount of drying energy needed for this portion of the process.

Final board finishing steps are also eliminated by the inventive process, which steps are presently performed in standard paper-faced gypsum board production. For example, the creasing wheels of the present inventive production line consistently produce a gypsum board having a desired width when the creases are folded over the joined top and bottom sheets, as explained above. Thus the need to saw the board's longitudinal edges to provide a consistent width of the gypsum board segments is eliminated.

Additional benefits derive from use of the inventive gypsum board production. The production line, as configured, can be quickly and easily converted from production of paper board to that of glass reinforced gypsum board, and vice versa, thus reducing retooling expenses and downtime during conversion from one to another production mode. This can be done without stopping the production line. The higher line speed allowed by the inventive production process reduces the overall costs of manufacturing by reducing the fixed costs relative to gypsum board output, thereby increasing marginal profits.

The process utilizes a denser gypsum mixture for the front and the back and the lateral end surfaces to provide structural strength and a lighter, lower density core, which results in an overall reduction in the weight of the board, as well as a reduction in the marginal manufacturing costs. Delivery costs can also be reduced without exceeding maximum transport weight limits set by governmental regulatory agencies. Handling at a construction site is much easier, since no uncovered glass-fibers are exposed that may penetrate the skin of the workers using the board and thereby inhibits worker's physical discomfort. Another structural benefit results from the ability of forming the edges without cutting, again eliminating exposed glass fibers and further strengthening the structural integrity of the final gypsum board segments.

An additional benefit and improved performance characteristics derive from the ability to include additives into one or more of gypsum slurries 38, 44, 138. For example, if an improvement in the fluid-resistance of the front face or back face surfaces of the board is desired, an additive, such as a polymeric compound, may be included in the mixture of constituents input directly into the controller 36 and/or 136. Such additives may be selected to provide any of a number of desired characteristics, such as fluid resistance, structural strength, ability to provide an applied finishing system substrate for further finishing of the front face, including attachment of finishing elements thereto, for example, stucco wall-covering, etc.

It has been found and it is a feature of this invention that addition of a specific group of polymer additives, when mixed into the dense slurry 38, provides a number of these characteristics that provide the defined advantages. The solid polymeric compounds are dissolved in water or other liquid in almost any desirable proportion, but preferable is a solution of about a 45% polymeric solids content diluted in liquid. In a preferred embodiment, the polymeric solution is pumped to the predetermined controller(s), for example controllers 36, 136, and added to the mixture of dense slurry 38, 138 mixed in each chamber of mixer 30. The dense slurry controllers 36, 136 then supply the dense slurry 38, 138 through outlets 34, 134 directly to the applicator roll coater wheels 22, 22' as needed, to provide an increased physical surface strength to the completed gypsum board, so as to significantly exceed standard board specifications.

Ideally, the polymer additive in the gypsum slurry solution enhances the bonding strength also between the core slurry 44 and the outer surface dense slurries 38, 138 and between the dense slurry that extends across and through the mats of the glass fiber facing sheets 14 and 114'. The polymer may be generating a polymer matrix that extends from the junction of the lower density core slurry and into the dense slurry layers 38, 138, which have penetrated through the sheets 14, 114, and to extend to the gypsum board surface. The polymer matrix is effectively embedded within the gypsum base and provides a coalescing surface upon which further finishing can be based, e.g., painting or a water impervious acrylic cover, that may be added at this stage of the finishing process, for example, by spray coating.

The surface texture of the front face of the completed gypsum board includes the polymer, which as a part of the underlying matrix, presents a smooth dense layer of gypsum to which other polymeric, e.g., acrylic, compounds can adhere. As the polymer layer cures, for example, in the drying process, it hardens to provide a stiff surface capable of retaining a load. The surface having the polymer additive, reduces chalking. improves water resistance and provides specific sites for chemical adhesion by other polymers. The composition of a water resistant or impervious coating can comprise one or a combination of the following polymeric compounds: polyacrylamide, polymethylacrylamide, polyvinyidene chloride (PVDC), polyamide, poly (hexamethylene adipamide), polyvinylchloride (PVC), polyethylene, cellulose acetate, polyisobutylene, polycarbonate, polypropylene, polystyrene, styrene butadiene, styrene butadiene copolymer, polychloroprene, styrene, butadiene, styrene butadiene copolymer, polychloroprene, styrene, butadiene, NEOPRENE® (polychloroprene), natural rubber, poly (2,6 dimethyl pentene oxide), poly (4-methyl-1-pentene), TEFLON® (polytetrafluorethylene, tetrafluoroethylene fluorocarbon, fluorinated ethylene propylene), and polydimethyl siloxane.

Before the drying step, when the gypsum board has not yet been cured, an optional acrylic coating step may be performed at an appropriate point in the production line. The acrylic application step includes applying an acrylic coating, by flood coating or other appropriate means, over the uncured polymer layer. The characteristics of the acrylic polymer tend to generate chemical bonds directly between the acrylic coating and the latex polymer additive embedded in the gypsum board surface. Alternatively, the acrylic coating may be applied after cutting of the gypsum board into desired lengths, and after the board segments are turned over to receive the acrylic coating.

The acrylic coating keys into the surface layer, creating a temporary mechanical bond on the front face. Subsequent drying and curing of the gypsum board surface in a conventional dryer, including the acrylic coating, generates a chemical bond between the polymer matrix and the acrylic front face coating. The copolymeric chemical bond thus formed inhibits water absorption by the GRG board product, and further inhibits peeling of the surface layers of the gypsum board during subsequent handling of the board and during subsequent weathering of the board during its use in construction.

Preferably, the polymer additive which has been noted as producing the desired characteristics comprises one or more polymer taken from a group consisting of acrylic, styrene, butadiene, latex, or polyvinyl acetate polymers and copolymers that are dissoluble in water or other fluids, such as those listed above. The delivery of the polymer in solution may be targeted into the complete slurry mix, including dense and core slurries, or may provide a targeted delivery to the dense slurry controllers, either 36 or both 36 and 136, or may even be directly targeted into the outlet 34 which delivers dense slurry 38 to the front face sheet 14. Addition of polymer, especially at strong concentrations, may affect the fluidity of the gypsum slurry, and thus, additional water and or a retarder may be necessary for use with the polymer additive, or later in the processing as needed, for example, after the slurry/polymer combination has been mixed.

Preferably, the polymer is in solution with the water and can be in a range of from about 1% to about 99% solution, but a preferable range is from about 40% to 50% polymer, and most preferably is about 45% polymer by weight. Preferably, the polymer solution is pumped into the controllers for delivering gypsum slurry to the front and back face sheets 14, 114' at a supply rate between about 190 cm$^3$ (0.05 gallons) per minute to about 0.019 m$^3$(5.0 gallons) per minute and a preferred rate of between 190 cm$^3$ (0.1 gallons) to 0.004 m$^3$ (1.0 gallons) per minute. The actual delivery rate may vary depending on the speed of the board production line and other manufacturing considerations.

The surface coating is preferably applied to the front board face directly onto the smooth or textured surface at a rate that results in a thickness in the final gypsum board product, also referred to as the dry coverage thickness, in a range from about 0.5 mils. to about 4.0 mils. The application rate measured by weight of the wet acrylic solution per unit area of the board surface covered can be in a range of from about 0.0054 grams/cm$^2$ (0.18 ounces per square foot (oz./sf)) to about 0.045 grams/cm$^2$ (1.45 oz./sf). Ideally, the acrylic coating may comprise at least in a portion thereof one or more rheology modifying compounds that assist the coating in striking into the front face slurry surface layer.

The acrylic surface coating may comprise any of a variety of acrylic polymer resins having a glass transition temperature ($T_g$) that is in a range of from about 15° C. to about 50° C., and preferably about 20° C.–30° C. for example, those surface coating materials set forth above.

The combination of polymers and acrylic coatings used preferably can produce a monomer, such as methyl acetate, ethyl acetate, butyl acetate, or a combination thereof. A desirable minimum film formation temperature of about 15° C. to about 30° C. has been obtained from ethyl acetate monomers or a combination of monomers comprising methyl acetate and butyl acetate. Of course, the type of monomer that is formed is dependent on the interaction that occurs in the reaction during curing between the polymer additive and the acrylic coating.

The acrylic or other copolymer surface coating may be added well after the gypsum board has been completed, that is, cured and dried, or even after the gypsum board is in an installed state at the work site, the underlining matrix of dense gypsum and additive material provides a good bonding surface for the copolymer surface layer.

For added bonding strength between the polymer additives and the copolymer surface layer, it is possible to apply the co-polymer surface layer, for example, an overlying acrylic layer, before or during the curing process. Application of the copolymer layer prior to completely curing the bonds formed between the polymer additive and the acrylic permits the number of such bonds to be multiplied and these are maintained and strengthened during the curing process since the polymers are cured together to produce a stronger and more durable surface coating in the final gypsum board product.

Referring now to FIG. 7, a completed inventive gypsum board product 190, manufactured according to one or more of the above-described inventive processes, is illustrated. In the gypsum board product 190, a core slurry 44 is essentially encased in a sheath comprising glass mat face sheet 14, folded over the longitudinal board edge, and by the top (back) facing sheet 114', disposed over the hydrated core slurry 44 and the folded over edge of facing sheet 14. Dense slurry 38 and 138 are disposed over the entre outer surface of the glass fiber facing sheets 14 and 114' so that a minimal amount of, if any, glass fibers are exposed at the surface. The inventive process provides for corners at the longitudinal edges 95, one of edges being shown in FIG. 7.

Testing of the acrylic coated compound revealed an increase in tensile strength, especially when utilized with water resistant additives in the core and polymer modified dense gypsum slurry layers. The testing results of samples indicate an average tensile strength of a minimum of about 100 kPa (15 psi) to a maximum of about 235 kPa (34 psi), meeting and exceeding the minimum requirements and standards promulgated by the International Conference of Building officials. The data appears to provide support to the theory of intermolecular bonding between the performance enhancing acrylic coatings and the polymer covering embedded in at least the dense slurry layer 38/138 of the top face sheet 14. Additional intermolecular bonding may be obtained by varying the acrylic compounds used, or a combination of compositions, or varying other parameters such as the solution strength, the application rate and the time and condones of curing, so as to increase the final gypsum board product's tensile strength and other desirable characteristics.

This invention has been described with reference to the above disclosed embodiments. Modifications and alterations of the disclosed embodiments are within the ability of persons having ordinary skill in the gypsum board art, and this invention is not intended to be limited to the description of the disclosed embodiments, the invention being limited only by the following claims and equivalents thereof.

What is claimed is:

1. In a gypsum board forming device comprising a supply of continuous sheet of inorganic fiber having random interstices between the fibers comprising said sheet, a gypsum slurry mixer including a gypsum delivery mechanism, at least one gypsum penetration station for penetrating a gypsum slurry into said random interstices between the inorganic fibers, a gypsum core delivery mechanism, a sheet joining mechanism for joining said continuous sheet of inorganic fiber to a core of gypsum, and a gypsum conveyor line, having a belt with a surface, for conveying formed gypsum board from the sheet joining mechanism, and a gypsum forming station assembly comprising:

a) two laterally disposed edger shoes having at least one laterally disposed edger bar clamping element attached to said edger shoes;

b) at least one laterally extending forming plate, having two ends, extending over a top surface of the formed gypsum board and between said edger bar clamping element so that the at least one forming plate rides over and smoothes said gypsum board top surface, at least a portion of said at least one forming plate having a plurality of micropore conduits connected to a source of pressurized water and terminating at the board contact surface of the at least one forming plate in a plurality of microporous apertures, wherein during operation, the microporous apertures provide a film of water over the top surface of the formed gypsum board, which in conjunction with the force exerted by the board contact surface of said at least one forming plate on said board surface, produces a very smooth front face surface thereon.

2. A gypsum forming station assembly according to claim 1 wherein said source of pressurized water is connected to said plurality of micropore conduits through a manifold.

3. A gypsum forming station assembly according to claim 1 wherein said source of pressurized water provides a continuous film of water over the surface of the top surface of the gypsum board product.

4. A gypsum forming station assembly according to claim 1 wherein said pressurized water in said source includes chemical additives.

5. In a gypsum board forming device comprising a supply of continuous sheet of inorganic fiber having random interstices between the fibers comprising said sheet, a gypsum slurry mixer including a gypsum delivery mechanism, at least one gypsum penetration station for penetrating a gypsum slurry into said random interstices between the inorganic fibers, a gypsum core delivery mechanism, a sheet joining mechanism for joining said continuous sheet of inorganic fiber to a core of gypsum, and a gypsum conveyor line, having a belt with a surface, for conveying formed gypsum board from the sheet joining mechanism, an edger bar assembly comprising:

a) two laterally disposed edger shoes having a bottom surface adapted to ride on the belt surface;

b) laterally disposed edger bar clamping elements attached to said edger shoes;

c) a longitudinal edger bar, having two ends, extending over said belt surface and between said edger bar clamping elements so that each end of said edger bar is disposed within one of said laterally disposed edger bar clamping elements; and d) each edger shoe having a flapper edge mechanism attached thereto, said flapper edge mechanism having an inboard surface abutting the edge of the gypsum board for retaining unset slurry skimmed off the surface of the wet gypsum board by said edger bar from overflowing onto the belt.

6. In a gypsum board forming device according to claim 5, wherein said edger bar further comprises a rounded leading bottom edge for skimming over the surface of the wet gypsum board.

7. In a gypsum board forming device according to claim 5 further comprising an acrylic coating application station for applying acrylic on at least one of said gypsum board surfaces by flood coating.

8. In a gypsum board forming device comprising a supply of continuous sheet of inorganic fiber having random interstices between the fibers comprising said sheet, a gypsum slurry mixer including a gypsum delivery mechanism, at least one gypsum penetration station for penetrating a gypsum slurry into said random interstices between the inorganic fibers, a gypsum core delivery mechanism, a sheet joining mechanism for joining said continuous sheet of inorganic fiber to a core of gypsum, and a gypsum conveyor line, having a belt with a surface, for conveying formed gypsum board from the sheet joining mechanism, an edger bar assembly comprising:

a) at least two edger bar mounting bases, one each mounted at a lateral edge of said edger bar assembly;

b) two laterally disposed arms, one each attached to each edger bar mounting base;

c) a longitudinal edger bar, having two ends, extending between said at least two edger bar mounting bases;

d) laterally disposed edger bar clamping elements attached to said edger bar;

e) each mounting base having a flapper edge mechanism attached thereto, said flapper edge mechanism having an inboard surface abutting the edge of the gypsum board for retaining unset slurry skimmed off the surface of the wet gypsum board by said edger bar from overflowing onto the belt.

9. In a gypsum board forming device according to claim 8 wherein said flapper edge mechanism further comprising at least one flapper disposed at the lateral edges of the edger bar assembly, said flappers comprising a smooth surface and having a slippery or non-stick material.

10. In a gypsum board forming device according to claim 9 wherein said slippery or non-stick material further comprises at least one compound selected from a group consisting of polytetrafluorethylene, tetrafluoroethylene fluorocarbon and fluorinated ethylene propylene.

11. In a gypsum board forming device according to claim 8, said edger bar further comprising a bottom edge for skimming over the surface of the wet gypsum board and a pre-forming plate disposed at the leading edge of the edger bar, said pre-forming plate having an angle relative to the surface of said bottom edge.

12. In a gypsum board forming device according to claim 11, wherein said angle is in a range of from about 30° to about 60°.

13. In a gypsum board forming device according to claim 11, wherein said angle is about 45°.

* * * * *